Feb. 20, 1934.    R. A. STEPS    1,947,679
MASTER CYCLE CONTROL APPARATUS
Filed Feb. 11, 1931    6 Sheets-Sheet 3
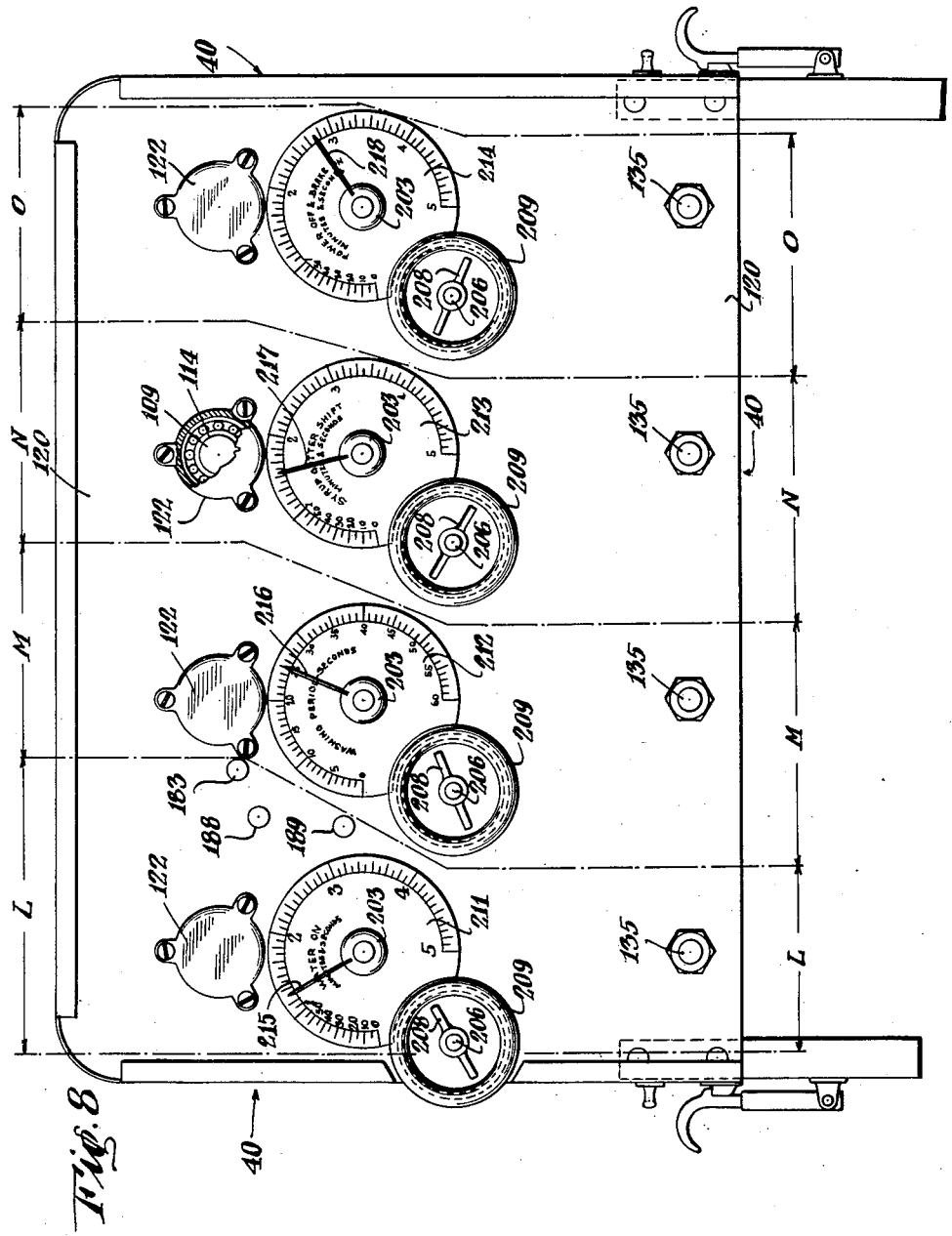
INVENTOR.
Robert Alexander Steps

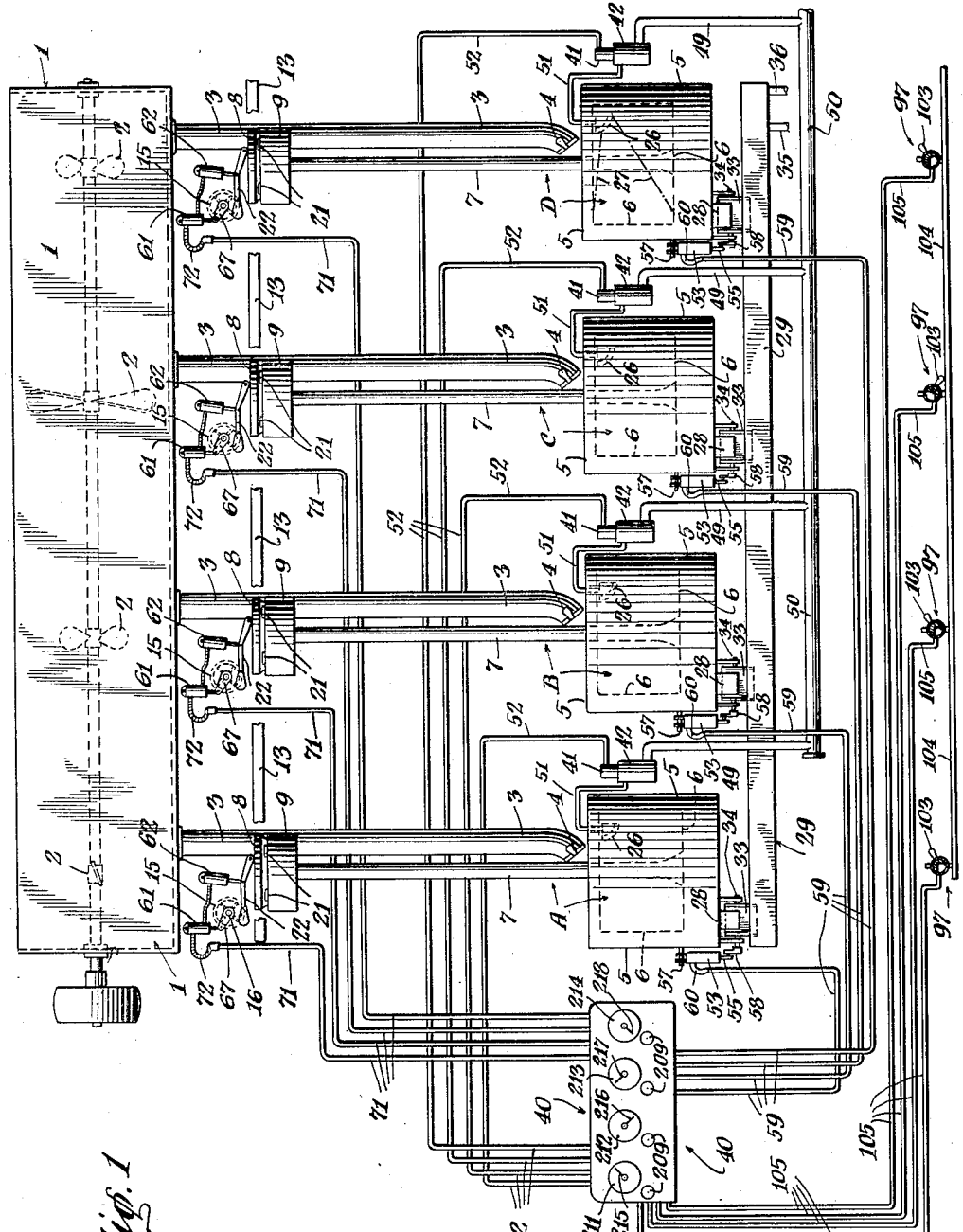

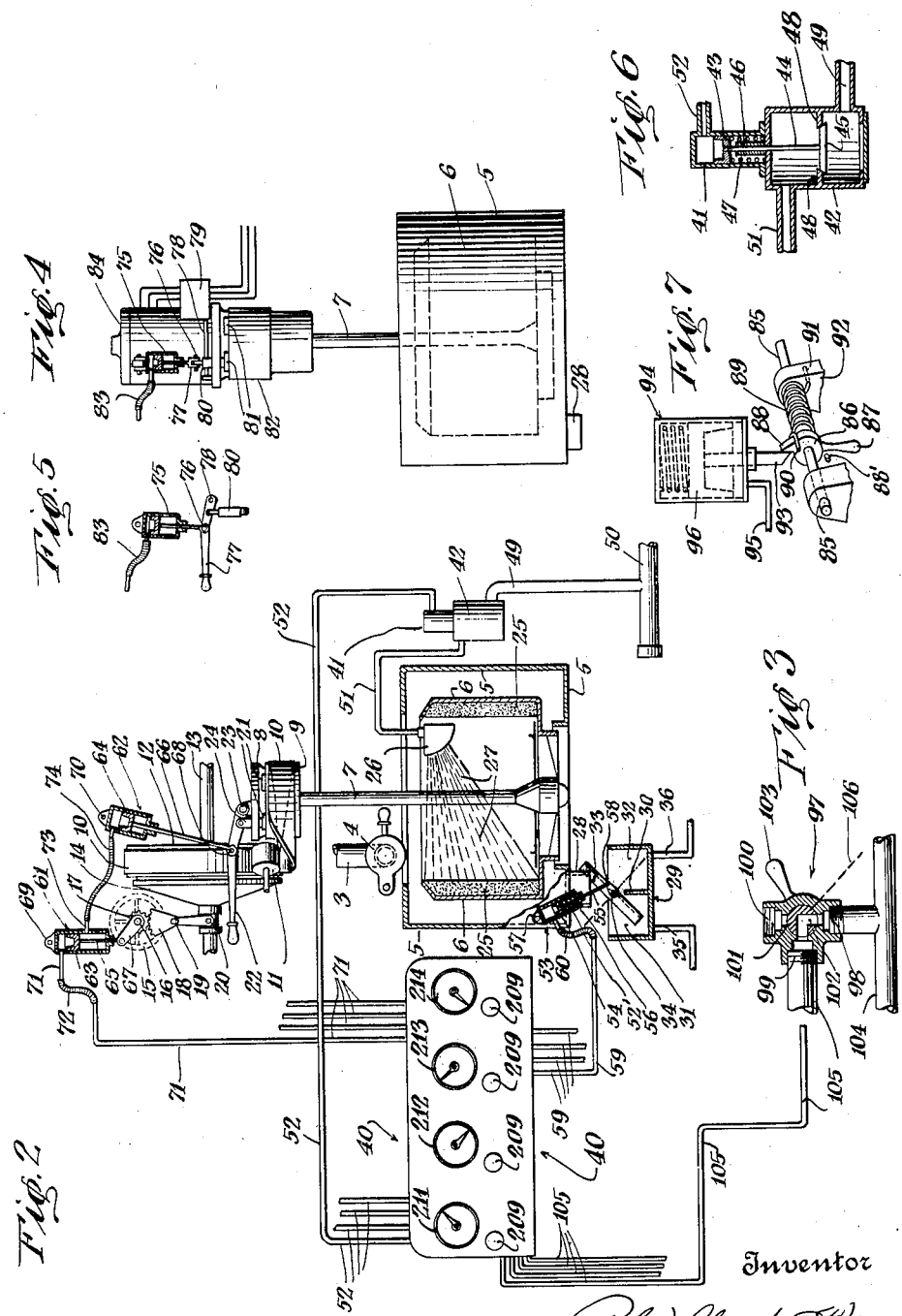

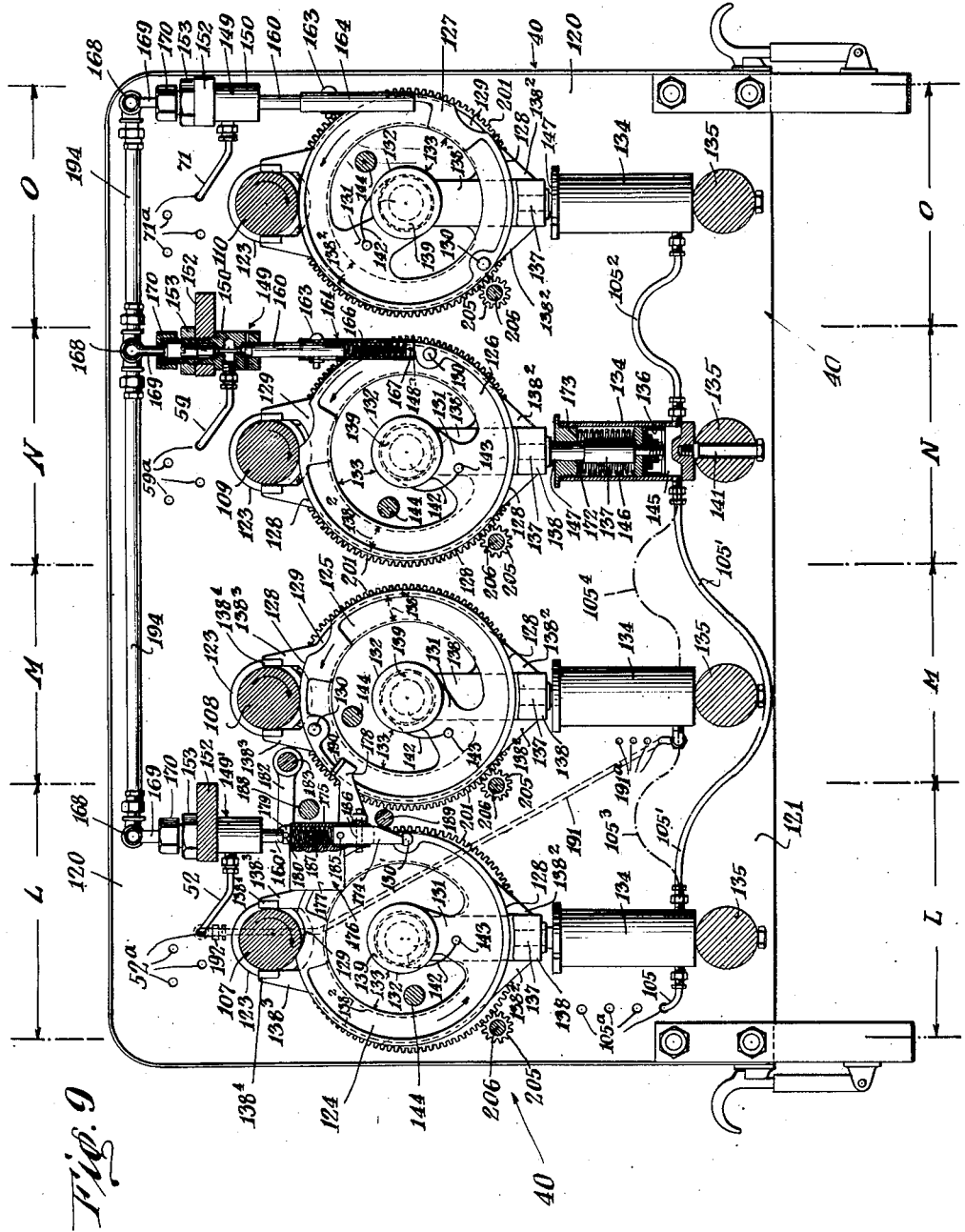

Feb. 20, 1934.  R. A. STEPS  1,947,679
MASTER CYCLE CONTROL APPARATUS
Filed Feb. 11, 1931  6 Sheets-Sheet 5
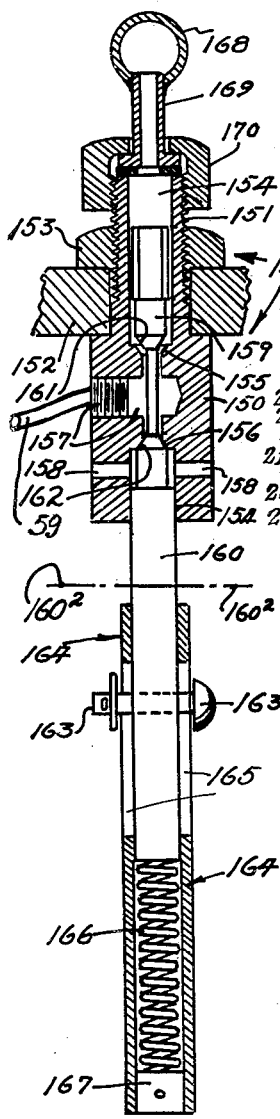
Fig. 9a
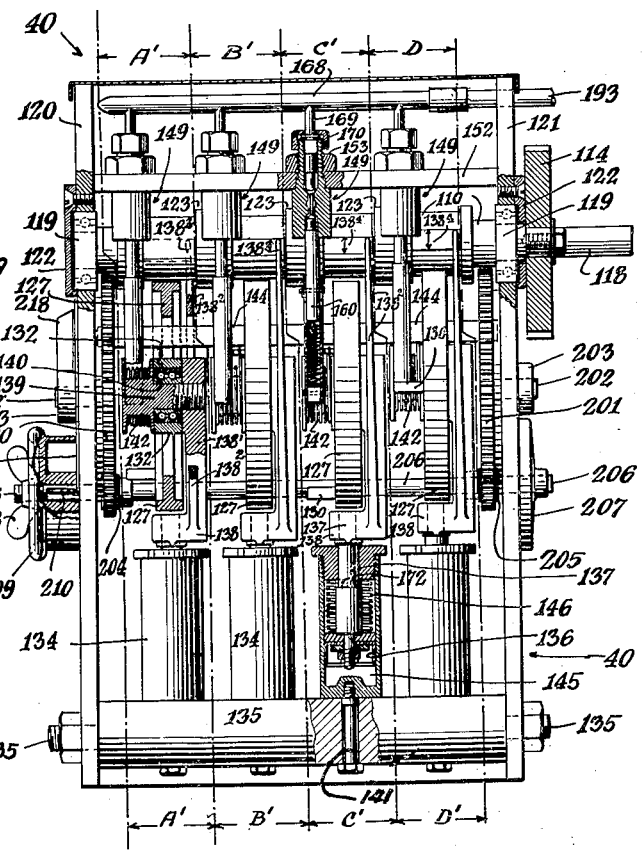
Fig. 10
Fig. 9b
INVENTOR.
Robert Alexander Steps

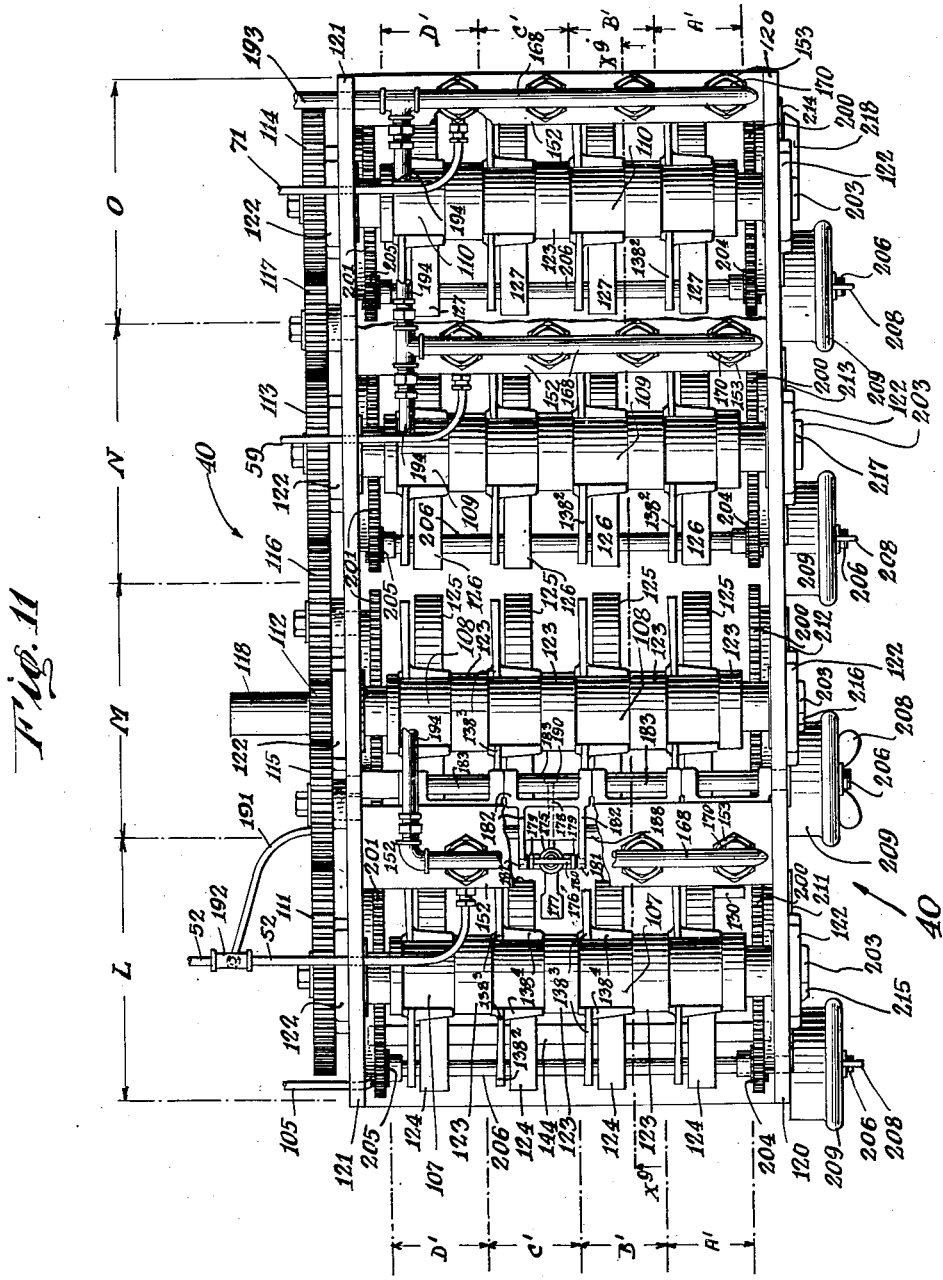

Patented Feb. 20, 1934

1,947,679

UNITED STATES PATENT OFFICE 1,947,679

MASTER CYCLE CONTROL APPARATUS

Robert Alexander Steps, Los Angeles, Calif.

Application February 11, 1931. Serial No. 515,011

7 Claims. (Cl. 161—1)

In many industries such as rubber, chemical, sugar, mining, etc., it is common to erect and operate a group of substantially similar machines, which for the purpose of this invention may be called "primary mechanisms", each such machine or primary mechanism being adapted to pass through or perform a series of operations upon a time cycle which is substantially the same for all of the primary mechanisms in the group, and which time cycle is adjustable as to the various time periods constituting the same. When, in the machines, or primary mechanisms, to which this invention relates, it is desired to change the time cycle for any single primary mechanism, this is usually due to some special cause or circumstance which is common to all the primary mechanisms in the group, so that the same adjustment in the time cycle should be made approximately simultaneously for all the primary mechanisms in the group. It is a condition of all these classes of machinery, however, that each primary mechanism must operate independently of the other ones in the group. That is, it must be possible to start each primary mechanism on its cycle at any desired moment, without respect to the other primary mechanisms or the phase of their respective cycles which they happen to be in. Since the periods comprising the time cycle must be accurately measured, it has been customary in some cases to introduce automatic control equipment for controlling the cycle, and measuring the time periods, for each of the primary mechanisms. In view of the conditions above set forth, however, particularly the condition that each primary mechanism must be operatable independent of the others in the group, it has been necessary to use what might be termed "individual" control apparatus, that is, a separate control apparatus, or group of control apparatus, for each primary mechanism in the group, and this multiplicity of control equipment has several important objections. The principal objection is the multiplicity of adjustments to be made each time that the cycle is changed for the entire group of primary mechanisms. To illustrate: If there are 8 primary mechanisms in the group, and 4 steps or time periods, to be measured for the cycle of each primary mechanism, then with the individual controls, it is necessary, when the cycle is changed, to make a total of 32 adjustments for the entire group, and of course such a large number of adjustments is awkward and undesirable, amounting to a considerable objection, especially in those cases where conditions require that the cycle be frequently changed for the entire group of primary mechanisms.

My master cycle control apparatus overcomes the foregoing objections, and presents control equipment that is better and simpler than the ordinary aggregation of individual controls above referred to, and especially does it simplify the question of cycle adjustment, reducing the number of changes or adjustments in the above mentioned example from a total of 32 adjustments, to only 4. Of course the exact number may vary in each case, according to the number of time controlled steps in the cycle.

In this application I am setting forth my invention in combination with one broad type of my master cycle control apparatus, which type I like and for some purposes prefer above other types which I have heretofore invented. Amongst other things this present type is broadly characterized by having a constantly revolving actuating or timing member for each step in the cycle, so that if there are four steps, there will be four such constantly revolving actuating members in the control, or if there are more, or less steps in the cycle, there will correspondingly be more, or less of such constantly rotating actuating members, there being one for each of the controlled cycle steps or periods. Furthermore, each of the primary mechanisms in the group, has a separate and complete set of rotatable timing units, there being one such unit for each step in the cycle, and each such timing unit is adapted to engage and disengage its corresponding constantly rotating actuating member usually (but not necessarily) at the will of the operator who has charge of the primary mechanisms. In this way each primary mechanism can be started on its timing cycle independently of the others in the group. In connection with the broad arrangement of mechanism just described, it is a further important feature of this present invention that the adjusting mechanism for changing the duration or time period of each of the cycle steps, should change such period simultaneously or collectively for all of the primary mechanisms in the group, preferably as the result of a single simple act of adjustment, instead of requiring the repetition of this adjustment for each primary mechanism as is necessary with the individual automatic controls ordinarily used. Also, although it is not an absolutely essential part of this invention, nevertheless I prefer to add properly graduated indicator mechanism, with pointer, for directly showing the length of each time period for which the adjustment is set, such indicator mechanism being preferably, although not necessarily, in the form of a dial, and even though there are several time periods to be indicated, these could if desired, be arranged through gearing, to be shown by a like number of pointers all operating on a single central dial, but for purposes of mechanical simplicity I prefer to use one such graduated dial with its corresponding pointer, for each of the controlled periods or steps, so that there will be as many of these separate dials and pointers as there are controlled steps in the cycle.

In addition to the foregoing, other features and advantages of this invention will become apparent through consideration of the detailed description hereinafter set forth, and also of the drawings and claims hereto appended.

As heretofore pointed out, this invention has application in many industries, and in connection with many different kinds of machines in those industries, the generic term "primary mechanisms", as heretofore set forth, being used in this specification as covering all such machines to which this invention applies. For the purpose of giving a specific and detailed illustration of this invention, however, I have selected the case of the sugar industry, and particularly a group of centrifugal machines therein, as these constitute a good example of "primary mechanisms" within the meaning above set forth. These sugar centrifugals operate in a group, usually 6 or 8 of them, and they operate on a time cycle which at any instant is approximately uniform for all the centrifugals, and which is frequently adjustable, and it is also necessary for these centrifugals to operate independently of each other so that they can be started at different independent times with respect to each other, although the same time cycle is imposed on each of them when or after each has been started. The attached drawings and detailed description will therefore illustrate this invention in connection with such sugar centrifugals, but it is understood that these have been selected only as an example of the "primary mechanisms" included in this invention, and that other machines such as presses, process vats, and many other kinds of machinery used in various industries can be substituted for the centrifugals all within the spirit and meaning of this invention.

Before starting the detailed description, I would like to remark that I usually prefer to concentrate in a frame or cabinet the various parts and pieces of mechanism that comprise the timing elements in my master cycle control, and to locate such cabinet or frame in some convenient position with reference to the group of primary mechanisms which it governs or controls. Therefore it is obviously necessary to arrange for in some way transmitting some sort of force or energy impulses from this cabinet or frame to the various parts of the several prime mechanisms, in order to automatically perform or expedite there the various timed operations in the cycle, which the control governs. In selecting the kind of force or impulse to be used for this purpose, various forms of energy are suitable as for instance, electricity, water pressure, air pressure, direct mechanical force, etc. That is, my control apparatus can be operated electrically, hydraulically, pneumatically, mechanically, etc., all depending on the choice of the designer or user of the apparatus, and the changes in the mechanism for adapting it to these different kinds of energy are comparatively simple to make. In the drawings I have elected however, to illustrate the apparatus as operated pneumatically, because I have found this form of operation entirely satisfactory in practice, but I wish to point out that I am fully aware that other forms of energy can be substituted for the compressed air all within the scope and spirit of this invention.

In the drawings Fig. 1 is a diagrammatic view illustrating my invention as a whole, applied to centrifugal machines as an example of "primary mechanisms", as previously explained. Fig. 2 is a similar diagrammatic view, confined however to one centrifugal, in order that certain parts and connections can be illustrated more clearly. Fig. 3 is an enlarged view, also partly diagrammatic, of a valve used in my pneumatically operated mechanism. Fig. 4 is a diagrammatic view showing certain connections of my apparatus to centrifugals when latter are electrically driven, instead of belt driven as in Fig. 2. Fig. 5 is a side view of a portion of the mechanism illustrated in Fig. 4. Fig. 6 is a cross section of my pneumatic wash water valve used in connection with my apparatus for centrifugals. Fig. 7 is a diagrammatic view of a detail hereinafter referred to. Fig. 8 is a front view of the cabinet which houses the timing elements, as hereinafter described. Fig. 9 is a cross section through the cabinet, this section being parallel to, and taken just behind the cabinet face, as shown in Fig. 8, the section in fact being along the line $X^9$—$X^9$ in Fig. 11. Fig. $9^a$ is an enlarged sectional view through an air valve which I use in one form of this invention. Fig. $9^b$ is an enlarged view of certain detailed parts that will be more particularly referred to later. Fig. 10 is a side view looking into the cabinet after the cover is removed, and showing some of the parts in section, for purposes of clearness. Fig. 11 is a top view looking down on the cabinet after the cover is removed, and showing some of the parts broken away in order to disclose parts below.

I will first describe the centrifugals, and their mode of operation, without the control, in order that the subsequent description of the control apparatus can be better understood in relation thereto, including the connections, mode of operation with the control, and benefits derived by addition of latter to the centrifugals.

This can best be done by reference to Figs. 1 and 2, and these centrifugals will be described only briefly, and in their general aspects, because they are common mechanisms and are well known in many industries.

Fig. 1 shows a group of four centrifugals, each being successively designated by the general reference letters A, B, C and D. These centrifugals operate below a common tank 1, containing stirring paddles 2, and from the bottom of this tank there descends feeding spouts 3, one of the latter leading to each centrifugal for the purpose of transmitting to it whenever desired, a charge of the material contained in tank 1. Such charge is admitted to the centrifugal by opening gate 4, at the lower end of spout 3, it being understood that in the form of the invention disclosed herein this action of opening gates 4 is a manual one. The centrifugals proper, in the belt driven form illustrated in Figs. 1 and 2, each consist essentially of a stationary curbing or tank 5, in which is suspended a rotatable basket 6 which is rigidly attached to a spindle 7, to be rotated thereby, this spindle being itself supported at its upper extremity by a stationary head casting 8, and the spindle having a belt pulley 9 rigidly keyed to it near its upper end, for transmission of belt power to it to rotate the basket 6, all of which is common construction as used in many industries. Even though the detail is omitted from the drawings for simplicity, it is understood that the vertical cylindrical wall of each basket 6 is perforated with extremely fine holes to permit liquids to pass out radially under contrifugal force when the basket is rotated, at the same time retaining solid particles in the basket because of the fineness of the openings through the basket wall. Fig. 2 illustrates how the basket and spindle are rotated by means of a belt 10 engaging pulley 9, and being quarter-twisted by means of idler 11 onto the main drive pulley 12 which runs loose on the main line shaft 13, but is operatively connected and disconnected thereto by means of clutch 14. This clutch is engaged and disengaged by operating handwheel 15 either in one direction or the other, this handwheel being carried by shaft 16, mounted in fixed bearings not shown, and this shaft carrying a pinion 17 which engages the toothed sector 18 which is fulcrumed at 19 in such manner that the clevis arrangement 20 can throw the clutch into and out of engagement with main drive pulley 12, according as handwheel 15 is rotated one way or the other. When handwheel 15, Fig. 2, is rotated clockwise it engages the clutch and causes the main drive pulley 12 to run with line shaft 13 to drive the centrifugal; and when handwheel 15 is turned counter-clockwise it disengages the clutch, thereby releasing pulley 12 from shaft 13, which permits the centrifugal to be stopped. For the purpose of rapidly stopping the centrifugal after the clutch is disconnected, a brake is used to overcome the momentum of the basket, spindle, etc., and this brake consists of brake shoes 21 operated by lever 22, the latter being fulcrumed at 23, and having a link connection 24 with shoes 21. When lever 22 is pulled down to its lowest position it sets the brake, thereby bringing the centrifugal to rest, and when lever 22 is raised it releases the brake, thereby permitting the centrifugal to spin under influence of power shaft 13 when the clutch 14 is engaged by actuating handwheel 15 clockwise, as previously explained. Many of the details of the clutch, brake, spindle, basket, etc. are omitted, these mechanisms being illustrated only diagrammatically in the drawings, because the entire centrifugal apparatus including these parts is standard in the trade, and is thoroughly understood by those engaged in it, and therefore minute description of all details of the centrifugals is not required here.

In the sugar industry it is common to apply a wash to the material 25, in basket 6, see Fig. 2, and this wash is applied through a distributing nozzle 26 having suitable connections with a source of supply. Fig. 2 shows this wash being applied in the form of spray 27.

It will be understood that the liquid which is thrown out radially through the revolving perforated basket wall 6, will be collected in the stationary curbing 5, in which it naturally will drain to the bottom, and then pass out through fitting 28, see Fig. 2. Sometimes it is desired to separately collect the liquid that is so thrown out before application of spray 27 to material 25, from the liquid that is thrown out after spray 27 is applied, and for this purpose a double trough 29 is arranged below fitting 28, this trough having a partition 30 which divides it into two separate chambers 31 and 32. The movable chute or gutter 33, pivoted at 34, is provided, and when this gutter is in the position indicated by full lines in Fig. 2, it will discharge the liquid from the curbing and fitting 28 into the trough compartment 31, and when this gutter 33 is swung into the dotted line position shown in Fig. 2, it will discharge the liquid from fitting 28 into trough compartment 32, thereby effecting a separation of liquids by shifting chute 33 from one position to the other.

I will now describe the ordinary operation of these centrifugals, and will indicate the cycle of operations that each goes through.

Into tank 1, Fig. 1, is poured the entire contents of a vacuum pan, (not shown), after the vacuum pan has boiled the same to the required point for releasing it to the centrifugals. Such charge dropped from the vacuum pan into tank 1, is called a "strike" of sugar fillmasse, and contains a great many tons of this material. This fillmasse is a mixture of sugar crystals, and mother liquor, the proportions varying, but being sometimes about half and half. The purpose of the centrifugals is to spin this fillmasse in the baskets 6, to thereby separate the sugar crystals from the mother liquor, the latter being spun out through the perforated basket wall and being collected and drained off by curbing 5 and fitting 28, while the former, i. e., the sugar crystals, are retained in the basket because of the fine mesh of the perforations therein, and at the end of the spinning the collected sugar crystals are discharged from the basket, usually through the bottom, in a manner, and by discharging apparatus that is well known in the art, but forms no part of this present invention. In order to indicate more clearly the centrifuging of this fillmasse in the basket, together with certain steps in the operation, such as applying the wash fluid, and the shifting of chute 33 to separate the liquors, I will now describe a complete cycle for one centrifugal, starting with the centrifugal empty and at rest. In this condition the operator manually opens gate 4, which permits fillmasse from tank 1 to pour into the basket through spout 3, and when the required amount is in the basket, as judged by the eye of the operator, he closes gate 4 which cuts off the flow of fillmasse into the basket. The brake being released, the operator actuates handwheel 15 to engage clutch 14 as hereinbefore described, and the centrifugal begins to spin under power transmitted to it from shaft 13, through clutch 14, belt 10, etc. In a short time the centrifugal acquires a very high speed, usually about 1100 R. P. M. for a 40 inch basket, and the centrifugal force becomes very great, not only causing the fillmasse to wall up along the cylindrical side of the basket as indicated at 25, Fig. 2, but also causing the mother liquor, which is a syrup, to fly out radially through the fine perforations in the basket wall, into the stationary curbing 5 which collects and drains it out through fitting 28. The sugar crystals, freed of most of the syrup, remain in the revolving basket, as previously described. During the centrifugal separation of the sugar crystals from the syrup, or mother liquor, as just described, a point is reached after a fairly definite period of spinning at which all of the free mother liquor has been spun off, and to spin longer would do no good but would in fact do a little harm as subsequently described. This does not means however, that absolutely all the mother liquor, or syrup, has been spun out of the sugar. A thin film of syrup still coats each crystal and clings to it by force of adhesion. The total quantity constituting this film is very small in proportion to the total amount originally mixed with the sugar, but though small in amount the film with which it coats each crystal discolors the latter and lowers its purity far below the commercial requirements. Centrifugal force cannot spin this film off the crystals, because the force of adhesion by which it clings thereto is too great and prevents it, and the following washing action is therefore resorted to. When this stage in the cycle is reached, the operator turns on the wash water which flows through distributing nozzle 26 and uniformly covers the revolving sugar mass in the form of spray 27. The quantity of wash water varies with the character of the original fillmasse, and also with the desired purity which the particular grade of sugar is expected to attain. This wash water, or wash fluid, is turned on and off by mechanism that will be subsequently described, but in a general way it may be mentioned here that the connections to nozzle 26 are such that the fluid pressure at the nozzle is constant, and since the area of orifice opening of the nozzle is also constant, it follows that the quantity of wash fluid applied to the revolving sugar varies directly with the time of application. In other words, the quantity of wash water applied, can be accurately measured by measuring the time period during which the water flows from the nozzle. In the ordinary manual operation of the centrifugals, without control, the operator of course measures as best he can the desired quantity of wash fluid as required by the management, for each particular grade of sugar that he works. When this wash fluid strikes the sugar in the rapidly revolving basket, it passes through the sugar wall 25 by operation of centrifugal force thereon, and during this action it washes from the crystals the previously described film of mother liquor, or syrup, that clings thereto, thereby greatly improving the color and purity of the sugar. The thoroughness with which this is accomplished depends on certain factors which will be discussed later. This wash fluid, spun out of the basket, is of course collected by curbing 5, in which it drains down, and out through fitting 28, and when it is desired to collect this spun off wash fluid separate from the mother syrup previously spun off, this separation is effected by tilting the gutter 33 at the proper moment to make this separation as previously described. The full line position of this gutter, in Fig. 2, is the one which diverts the original mother liquor into trough compartment 31, and at the proper instant this trough is shifted to its dotted line position which will divert the spun off wash fluid into the other compartment, 32. These trough compartments comprising the general trough arrangement 29, run lengthwise of the station, collecting their respective liquors from the several centrifugals as indicated in Figs. 1 and 2, more especially the former, and at some point in the trough, usually near one end, the liquor from each compartment is drawn off, the pipes 35 and 36 being shown for this purpose, the former being in connection with trough compartment 31, and the latter being in connection with trough compartment 32, see Fig. 2. These pipes carry their respective liquors back into different parts, or points, in the general refining process, but further description need not be given here, except to say that the purity of the wash liquor collected in trough 32, and transmitted by pipe 36, is considerably higher than the purity of the mother syrup collected in trough 31, and transmitted by pipe 35, and that it is this difference in purity that justifies the separation of these two liquors, so that they can be worked differently, and each to its best advantage in the subsequent refining process. The trick is to shift the syrup gutter 33 at the correct moment in the cycle to give the sharpest difference in purity of the liquors collected in the two throughs 31 and 32. Later, I will refer to this point again. Continuing with the description of the main centrifugal cycle from the moment when the flow of wash water from nozzle 26 is stopped, it will be noted that at this instant the revolving sugar mass 25 in the basket will be wet with the wash liquor passing through it, and therefore in order to properly dry the sugar the basket should be kept rotating, usually at full high speed, for a definite period of time, during which the residue of wash liquor in the sugar mass will be spinning out of the basket, and will be collecting in trough compartment 32, the sugar mass 25 becoming drier and drier as this spinning proceeds. When the proper degree of dryness is reached the operator stops the centrifugal, by which I mean that he cuts off the power by means of handwheel 15, and applies the brake by means of lever 22, after which the centrifugal comes rapidly to rest as previously described. The sugar mass 25 is then discharged and collected from the basket, this mass of purified sugar being in fact the desired product of the operation, and the basket 6 being thus emptied, and at rest, the cycle is completed, and the centrifugal is started on its next cycle by repetition of the sequence of acts and operations as described.

To briefly summarize the foregoing, the spinning cycle after being started includes four important steps which should be performed at definite moments in the cycle in order to produce the best results. These are, first the turning on of the wash fluid, second the shifting of the syrup gutter, third the cutting off of the wash fluid, and fourth the stopping of the centrifugal by cutting off the power and applying the brake. The period required for the original manual charging of the centrifugal, and for the final discharging of the purified sugar from the centrifugal is not important because the centrifugal is either at rest or turning only slowly during these operations so that the purging process under centrifugal force is not progressing during these operations, but when the basket is charged with fillmasse and the real spinning commences, the so-called spinning cycle is in effect, and the four steps noted should be accurately timed in order that the best results be procured from this centrifuging process. I will now briefly indicate the bad effect that would follow from bad timing of these four steps. The time period elapsing before turning on the wash fluid through nozzle 26, should be just long enough to permit all the free mother liquor, or syrup, to spin out of the sugar crystals walled up in the revolving basket. If the wash water, or liquor, is turned on too soon it co-mingles with the original mother liquor, and the useful effect of the washing operation rapidly diminishes to the extent of this co-mingling. On the other hand, if the wash liquor is not promptly turned on after all the free mother liquor has left the basket, the intervening spinning is not only useless and wastes the time and power of the centrifugal, but it also needlessly packs and densifies the sugar mass under the high existing centrifugal force, and this does not permit quite such thorough and uniform washing when the delayed wash is eventually turned on. For these reasons the wash fluid should be turned on at a definite moment in the cycle. Likewise, gutter 33 should also be shifted at a definite moment, usually after the wash water has commenced to flow. Ordinarily, it is considered best to delay the shifting of gutter 33 for a definite period after commencement of washing. The reason is that at the instant when washing commences, the inner surface of curbing 5 is heavily coated with the low purity mother liquor which had just spun out of the basket. It is considered advisable to allow a portion of the wash fluid to spin into the curbing, to wash this low purity mother liquor off of the curbing wall, all of this mixture to pass through fitting 28 into the low purity trough 31. In other words, gutter 33 should not be shifted until a limited portion of the wash has drained the curbing clean of the mother liquor, and has passed with it into low purity trough 31. After this, gutter 33 should be shifted, the intention being that substantially all the liquor collected in trough 32 should be of the highest purity unimpaired by drainings of the low purity mother liquor, all of which should previously have passed into trough 31. In other words, there is a definite moment in the spinning cycle when gutter 33 should be shifted from one trough to the other. To make this shift too early would lower the final purity in trough 32, because some of the mother liquor would pass into it; and to make the shift too late would needlessly reduce the total quantity of high purity wash liquor collected in trough 32, because some of it would pass into trough 31. The precise moment at which the shift is made depends on various factors, such as the speed with which the wash fluid is applied, also the speed with which it passes through the sugar wall 25, also the viscosity of the mother liquor clinging inside of curbing 5, and also certain other factors, all of which vary with the grade of product being worked, so that the precise moment in the cycle for shifting the syrup gutter should therefore be adjustable. Turning now to the time period during which the wash fluid flows through nozzle 26, this obviously is of great importance, because it determines the total amount of wash fluid applied. If this period is too short, so that insufficient wash is applied, the color and final purity of sugar mass 25 will not work high enough, which is very objectionable; and on the other hand, if the period of wash is too long, so that too much wash water is applied, this needlessly dissolves the sugar in the basket and carries some of this pure sugar in solution out of the basket into trough 32, thereby needlessly reducing the final sugar yield recovered from the basket, amounting obviously to an important defect in the process. Therefore the period of washing should be accurate in order to wash the sugar to its best color, and maximum purity, without unnecessary wasting of sugar by dissolving it in needless wash. Also, the time period for drying, counting from stopping the washing to cutting off the power and applying the brake to stop the centrifugal, should also be quite definite, and accurate. If this period is too short the sugar will not be spun up to desired dryness, and the traces of wash liquor remaining therein will slightly discolor the sugar, and reduce its purity, and will also throw a needless burden onto the subsequent drying equipment through which the sugar passes later; whereas, if this drying period is too long, the productive capacity of the centrifugal is needlessly wasted, and in addition the sugar becomes packed so hard that it is difficult to remove it from the basket, which slows up progress and is objectionable for other reasons also. Therefore this drying period should be accurately measured and controlled.

The conclusion from the foregoing is therefore obvious that the four timed steps in the cycle should each be performed at an accurate moment, and that to the extent that discrepancies in the timing are permitted, the character of the general result is impaired in one way or another.

Also, it might be well to observe at this point, that while the four timed operations above described, are those which occur in centrifugals, nevertheless in other forms of "primary mechanisms" the timed steps or operations are naturally different, being in each case peculiar to the particular primary mechanism and to the nature of the cycle therein performed. It is also obvious that the effect of discrepancies in timing the cycle steps in "primary mechanisms" other than centrifugals, will of course be different from the discrepancy effects just described, but as a general rule the importance of maintaining an accurate time cycle in such other "primary mechanisms" to which this invention relates, is approximately as important as in centrifugals, although the reasons, and the effect of any discrepancy, is always peculiar to the particular "primary mechanism."

With ordinary manual operation of centrifugals in the sugar industry, (without automatic control), which incidentally, has been the mode of operation since the beginning of the industry to almost the present time, the operator manually performs the four cycle steps above referred to, and he endeavors to the best of his ability to maintain uniform times for these steps, but when his extremely crude methods of measuring time are considered, and the common human frailties are added thereto, it is not surprising that important discrepancies from the ideal cycle should occur frequently, so that perfect centrifuging is achieved only rarely with the ordinary manual operation of the centrifugals.

It is for the purpose of causing these timed operations in the cycle to be automatically performed, instead of manually, and for the purpose of giving accurate control and adjustment of same, together with certain structural and operating benefits for the entire apparatus, that I have contrived the invention set forth herein for "primary mechanisms" broadly, centrifugals being used only as an illustration of same.

Before describing the details of my control apparatus, and the mode of its association with the "primary mechanisms", I would like to point out an additional feature of the general operation, which is nicely illustrated by centrifugals.

The description hereinbefore given, for operating one centrifugal throughout its cycle, of course applies to all the centrifugals in the group, Fig. 1. The operator starts the first centrifugal, which consumes a little time, and he then similarly starts the second, then the third, and then the fourth, and he moves back and forth amongst them to manually perform at each the various cycle operations above mentioned. Even with the addition of an automatic control, such separate independent starting of the centrifugals is essential, and it would not be practical either from the power standpoint, or any other standpoint, to start all centrifugals in the group simultaneously.

The reason is that during the original accelerating period of each centrifugal, when its speed is being rapidly increased from approximately zero to approximately 1200 R. P. M., the power required is surprisingly large, rising possibly to 60 H. P., but when the accelerating period is ended and the machine is at full speed the power for driving it drops to a very small amount, usually about 5 H. P., or less. In view of this large amount of power for accelerating, and small amount of power for running each centrifugal, it would obviously be impracticable to start the entire group of centrifugals simultaneously, because the total power would be out of all proportion to the amount available. As a practical requirement, it is therefore necessary for each centrifugal to start separate and independent of the others, the latter being either at full speed, or at some other phase of their cycle. I mention the necessity of this independence between the different centrifugals, because it has an important bearing on the difficulty of contriving a master control providing simultaneous adjustment of any cycle period for all the centrifugals in the group, and at the same time permitting them to operate independently of each other in the manner set forth. This required independence as between different units in the group is a common characteristic of many kinds of "primary mechanisms", as used in different industries, and is not specially peculiar to sugar centrifugals. Apart from the question of power, the independence referred to is necessary for other reasons also.

Referring again to Fig. 1, I should like to add that since all the centrifugals in the group draw their fillmasse from the common tank 1, and since the character of fillmasse is at any instant substantially uniform throughout this tank, and is intentionally kept so by the stirrers 2 therein, it follows that the time cycle should be alike for all the centrifugals in the group, and should be so adjusted as to give the best possible centrifuging for the particular grade of fillmasse then in tank 1. Ordinarily, no additional fillmasse is poured into this tank, until that already therein has been emptied by working through the centrifugals, after which it is customary to quite thoroughly wash the tank, also spouts 3, and the centrifugals, in order to clean out all the fillmasse from the latch batch or strike because the next strike will probably be of different grade, and it is usually desired to keep the strikes separate from each other. Consequently, when the centrifugals start operating on the new strike, which usually differs in grade from the preceding one, it will be necessary to adjust the time cycle of the centrifugals to suit the new grade of fillmasse, and it is apparent that whatever cycle adjustment is required will be uniformly required for all the centrifugals in the group. It is at this point that my master control demonstrates one of its important advantages over individual controls. To adjust my master control, a single act for each time period will suffice and will apply to all the centrifugals in the group, whereas with individual controls the mode of adjustment is considerably more tedious and complex because each time period must be separately adjusted for each centrifugal, which calls for many more adjustments, and obviously is objectionably cumbersome.

The operating characteristics described in the last paragraph showing the reason for uniform operation as between all the centrifugals in the group, and also the reason for uniform adjustment as to all the centrifugals whenever adjustment is required at all, illustrated the underlying operating principle on which my master control rests, and incidentally also illustrates the larger practicability of my master control as compared with individual controls especially where the time cycle must be frequently adjusted. Also the foregoing circumstance whereby a certain occurrence, (like changing the grade of product worked upon, or some other kind of change), calls for substantially uniform and substantially simultaneous cycle adjustment as to all the "primary mechanisms" in the group, because they are all about equally affected thereby, is a fairly common circumstance as to various kinds or machines or "primary mechanisms" in various industries, and is obviously not limited to centrifugals only.

I will now turn to description of the timing apparatus, whereby the actual automatic control of the timed operations is procured.

As previously mentioned, I prefer to collect and concentrate the actual timing parts and members in a frame or cabinet, and such cabinet is shown and designated generally by reference numeral 40 in Figs. 1 and 2. From this cabinet various leads or connections are shown running to the various centrifugals, and to places in the latter where the timed operations are to be performed. It is through these leads that force or energy impulses are transmitted to the various points in the different centrifugals to perform the respective operations that are there required. The nature of these leads depends on whether the energy transmitted from the cabinet to the centrifugals is electrical, hydraulic, or pneumatic, being wires in the first instance, pipes in the second instance, and small tubes in the third instance. Also, the elements in the cabinet for releasing the energy, and the elements at the centrifugals for utilizing it, vary with the kind of energy used, being switches in the cabinet and solenoids of various kinds at the centrifugals when the operation is electrical, and being valves in the cabinet, and cylinders or diaphragms at the centrifugals when the operation is hydraulic or pneumatic. These kinds of energy and elements however, are common substitutes for each other, and having remarked upon same as intended substitutes in this apparatus, I will proceed with the description assuming that the apparatus is pneumatically operated, because this is as good a form of energy as the others, and better for some purposes, although each type of energy has its own advantages.

In order to facilitate the description, I consider it best to first describe the apparatus located at the centrifugals for receiving and using the energy released from the cabinet. The described operation being pneumatic, this energy receiving apparatus will naturally be illustrated as cylinders or diaphrams, and not as solenoids although the latter would be used if the operation were electrical.

The first such energy receiving device at each centrifugal is cylinder 41, see Figs. 1 and 2, which cylinder acts in conjunction with the wash fluid valve 42 the latter being shown in detail in Fig. 6. This cylinder of course includes a piston 43, and piston rod 44, the latter being permanently attached to the piston at its upper end and to the valve 45 at its lower end. In cylinder 41 is also located a stop-sleeve 46 fitting loosely on rod 44, and a compression spring 47 is also in cylinder 41.

The valve 45 seats against valve shoulder 48 in an obvious way, and from the space below valve 45 a pipe 49 connects the valve body with the supply header 50 through which the wash fluid (either water or other proper liquor) is supplied at constant pressure; while from the space above valve 45 a pipe 51 connects the valve body with nozzle 26, the latter having been previously described. From a place above piston 43 the small copper tubing lead 52 connects cylinder 41 with cabinet 40. The operation of this pneumatically operated valve is very simple. When compressed air is transmitted through tube 52 from cabinet 40 to cylinder 41, the piston 43 is depressed till arrested by stop-sleeve 46, and the valve 45 is thus opened in obvious manner, permitting the wash fluid to flow at a constant rate through the open valve and through nozzle 26, furnishing spray 27 for the sugar as previously described. When the compressed air is released from tube 52, piston 43 in cylinder 41 is urged upward by retrieving spring 47, and valve 45 closes in an obvious manner, thereby cutting off the supply of wash fluid to nozzle 26, and discontinuing spray 27 instantly.

The next energy receiving device at each centrifugal consists of syrup gutter cylinder 53, see Figs. 1 and 2, for automatically shifting syrup gutter 33. In addition to its cylinder body proper, designated by reference numeral 52', this cylinder 53 includes piston 54, piston rod 55 and retrieving spring 56. At its head end this cylinder is supported on a stationary pin 57 on which it is free to pivot; and at its other end the piston rod 54 is connected to pivot shaft 34 through crank 58 whereby the cylinder can swing gutter 33 from its full line to its dotted line position. From a point above piston 54 this cylinder is connected to cabinet 40 through tubing lead 59, the latter having a short piece of very flexible rubber tubing 60 spliced therein, in case the angular movement of cylinder 53 as occasioned by crank 58, is thought to require special flexibility beyond what the copper tubing 59 alone would give. The operation of this syrup gutter cylinder is very simple. When compressed air is released to it from cabinet 40 through tube 59, piston 54 is depressed, and through crank 58 the syrup gutter 33 is shifted from its full line position to its dotted line position, see Fig. 2, and the syrup gutter is held in the latter position until the compressed air is released from tube 59, after which retrieving spring 56 pushes piston 54 up to its original position, and syrup gutter 33 is thereby returned to its full line position.

The next energy receiving device at each centrifugal consists of the "power-off" and "brake-on" cylinder, or cylinders. In the ordinary belt driven type of centrifugals, as shown in Fig. 2, this usually calls for two cylinders, one for cutting the power off and the other for applying the brake, but in direct connected motor driven centrifugals, as illustrated in Fig. 4, one cylinder is ordinarily sufficient because it is common custom to interlock the switch and the brake so that the same motion that cuts the power off also applies the brake. In the belt driven centrifugals, the "power-off" cylinder is designated at 61, Fig. 2, and the "brake-on" cylinder is designated at 62. Each of these cylinders has a piston 63 and 64 respectively, and a piston rod 65 and 66 respectively, the former being connected to crank 67 which is itself keyed to shaft 16 carrying handwheel 15 as previously described, and piston rod 66 being attatched to brake lever 22 at pin 68.

Cylinder 61 is pivotally supported by stationary pin 69, and cylinder 62 is pivotally supported on stationary pin 70. Compressed air is admitted to the upper end of cylinder 61, from cabinet 40, through copper tube 71 into which is spliced if necessary a short piece of flexible rubber hose 72. From a lower point 73 in cylinder wall 61 there is a by-pass tube or connection 74 leading into the upper end of cylinder 62. These cylinders cut off the power and apply the brake as follows. When compressed air is transmitted from cabinet 40 to cylinder 61 through tube 71, piston 63 is depressed, thereby rotating crank 67, shaft 16, and handwheel 15, all counter-clockwise, and as previously described this cuts off the power from the centrifugal by disengaging clutch 14. The by-pass opening 73 leading from the cylinder wall 61 is so located that by the time piston 63 uncovers this by-pass opening 73, shaft 16 will have been sufficiently rotated to fully disengage clutch 14. Therefore after this clutch is disengaged in this manner the compressed air by-passes from cylinder 61 into cylinder 64 through connection 74, and the piston 64 in the brake cylinder 62 is depressed, forcing brake lever 22 downward to set the brake for the centrifugal. When the compressed air is released from tube 71, brake lever 22 can be raised manually to release the brake, and handwheel 15 can be rotated to engage the clutch and start the centrifugal again.

In the direct connected motor driven centrifugal, as diagrammatically illustrated in Fig. 4, the single cylinder 75 is sufficient both for cutting off the power and applying the brake. It accomplishes this by being connected through pin 76 to hand-lever 77, the latter being rigidly keyed to its fulcrum shaft 78 to turn therewith. This shaft passes into the main motor switch-box 79, and is operatively connected to the switch parts therein. The link 80 connects hand-lever 77 with brake shoes 81 which operate on the inside of brake pulley 82 in the same manner that brake shoes 21 in the belt driven centrifugal, Fig. 2, operate on the inside of pulley 9. When compressed air is admitted to cylinder 75, through connection 83, Figs. 4 and 5, this obviously serves to push hand-lever 77 downward, which action, through shaft 78 opens the circuit in switch-box 79, thereby cutting the power off the main centrifugal driving motor 84; and the same downward movement of hand-lever 77, acting through link 80, sets the brake, in a manner substantially similar to that in the belt driven centrifugal. When the compressed air is released from cylinder 75, hand-lever 77 can be manually raised, thereby making switch contact in box 79, to start the centrifugal after link 80 has disengaged the brake.

In the various operations above described, i. e., turning on the wash water, shifting the syrup gutter cylinder, and cutting off the power and applying the brake, the various cylinders which I have described may be said to expedite their respective operations by performing them directly, but instead of this the cylinders, (or their solenoid equivalents), can be used to expedite their respective operations by performing them indirectly. A simple illustration of this is diagrammatically illustrated in Fig. 7. In this drawing shaft 85, carried in suitable bearings, has a fitting 86 rigidly connected thereto, this fitting having a hand-lever 87 on one side and a tooth 88 on the other side. A strong spring 89 surrounds the shaft and has one end 90 attached to member 86, while the other end 91 of the shaft is anchored in the stationary bearing block 92. Tooth 88 registers with pawl 93 in an obvious manner, this pawl being guided so that its only movement is up and down along its vertical axis. When hand-lever 87 is swung clockwise it winds energy into spring 89, but this energy is prevented from rotating shaft 85 backward because tooth 88 is arrested by pawl 93. When pawl 93 is automatically raised however, either by solenoid or cylinder 94, this causes spring 89 to rotate shaft 85 counter-clockwise, thereby causing the happening of whatever operation shaft 85 is intended for, and since this shaft could, as an example, be obviously substituted for shaft 78 in Fig. 4, the operation would be to automatically cut off the power and apply the brake. In this operation it might be considered that cylinder 94 did not directly perform the final operation of cutting off the power and applying the brake, because this probably was more directly performed by the force of spring 89, but in any case it would be proper to state in a general way that this final operation was performed or expedited by cylinder 94 because it was the actuation of the latter that caused the occurrence of the entire operation. Obviously this sort of arrangement as illustrated in Fig. 7, with suitable modification or adaptation, could be applied and used for consummating or expediting many kinds of desired automatic actions, in addition to the specific use above indicated. In Fig. 7 cylinder 94 would be actuated or energized by admitting compressed air to it through tube 95, which enters the cylinder below piston 96, and thereby pulls pawl 93 upward. Tube 95 could of course be connected with the timing cabinet 40, the same as the other previously described tubes and cylinders are connected.

I now turn to another item in the apparatus. At each centrifugal there is also required some sort of device or arrangement by which that centrifugal independently of the others, can be placed under the influence of the timers in cabinet 40, and can be disconnected therefrom whenever desired. That is, as each centrifugal is charged and starts on its spinning cycle, there must be some arrangement for registering this fact in cabinet 40, so that the timers which therein correspond to that centrifugal will commence to measure, or time the cycle periods for that centrifugal. This connection can of course be made in many different ways, switches being preferable if the general operation of the control is electrical, and valves being preferable if the operation is pneumatic or hydraulic. Since the particular embodiment of the invention as illustrated in this application is pneumatic, I have therefore shown the valve 97, see Figs. 1 and 2, as the device for accomplishing the operation mentioned in this paragraph, but of course as previously indicated, I do not limit myself either to the valve, or to pneumatic operation. Fig. 3 shows this valve as a common three-way valve, the drawing of same being of enlarged scale in this figure in order to show the parts more clearly. The three openings in this valve are respectively designated by reference numerals 98, 99 and 100; and the rotatable valve plug, with its port, and handle, are respectively designated by reference numerals 101, 102 and 103. Valve opening 98 is connected to the compressed air supply header 104, which communicates with a source of supply not shown; while valve opening 99 connects with cabinet 40 through tube 105 the latter being shown enlarged in Fig. 3, and smaller in Fig. 2 to make it correspond with the other tubes in Fig. 2; and the third valve opening 100 is left open to the atmosphere. When the valve lever 103 is in the position shown in Fig. 3 the compressed air from header 104 is admitted to cabinet 40 through tube 105, and the centrifugal will be under the influence of its corresponding timers in cabinet 40, as will be explained in greater detail later; and when lever 103 is rotated 90 degrees clockwise to dotted line 106 in Fig. 3, it is obvious that valve port 102 will then connect valve openings 99 and 100, and will close off the valve against header 104, so that the air pressure will not be transmitted from this header to cabinet 40, but instead the compressed air will be exhausted from and through tube 105 into the atmosphere through valve opening 100. This will again be referred to in connection with the mechanism in cabinet 40.

Referring to Figs. 1 and 2, it will be noted that like parts for the various centrifugals are designated by like reference numerals, and also that the connections or tubes running from cabinet 40 to like points in the different centrifugals are also designated by like reference numerals.

Turning now to the detailed apparatus in cabinet 40, this can best be understood by reference to Figs. 9, 10 and 11. These in a general way being sectional views from the front, side and top, respectively.

Essentially the equipment in this cabinet consists of a constantly rotating timing or actuating member for each controlled operation, i. e., one such member for each of the timed cycle periods; and in some way operatively connected thereto, there is for each centrifugal (or other "primary mechanism") in the group, a separate set of rotatably mounted timing units including one such unit for each of the controlled operations. The nature and detailed construction of the constantly rotating timing members, and of the rotatably mounted timing units, and the particular manner or means by which these are operatively connected to or with each other, can vary very extensively, all according to the detailed tastes and desires of the designer of this mechanism. The form of these and other parts, as shown in the drawings, and in the following detailed description, is illustrative of only one kind or type of these parts, but extensive variation is permissible without departing from this invention.

In Figs. 9, 10 and 11, I have elected to illustrate the constantly rotating timing or actuating members in the form of constantly rotating shafts, a total of four in number, one for each of the previously described cycle operations, these shafts being respectively designated by reference numerals 107, 108, 109 and 110. Each one serves for all of the "primary mechanisms" in the group, and for the particular centrifugal operations illustrated, the first of these shafts cooperates in measuring the time for turning on the wash fluid, the second one 108 for turning off the wash fluid, the third one 109 for shifting the syrup gutter, and the fourth one 110 for cutting off the power and applying the brake. In the particular design illustrated, these shafts as viewed in Fig. 9 all rotate clockwise, and they are driven by a train of gears illustrated in Fig. 11, and consisting respectively of gears 111, 112, 113 and 114, which, by means of intermediate gears 115, 116 and 117 are all meshed together to form a continuous train of gears. I prefer to extend one of the shafts, preferably 108, through the rear of the cabinet as illustrated at 118, Fig. 11, and by means of this shaft extension 118, I prefer to drive shaft 108 at a constant speed, and this rotation of the one shaft causes the other three shafts 107, 109 and 110 to also rotate at a constant speed because of the intermeshing action of the above described train of gears. Shaft 108 can be thus driven from its extension 118 in any suitable manner, as for instance through a pulley, gear connection, or in any other suitable manner that is convenient at the plant, the particular mode of this drive being immaterial, so long as it results in a substantially constant speed for shafts 107, 108, 109 and 110. Each of these four shafts can be conveniently mounted in two ball bearings 119, one near each end of its shaft, these bearings themselves being carried in the front and rear walls 120 and 121 of the cabinet respectively, and each such bearing being covered by a bearing cap 122, all of which is best illustrated in Fig. 10, although Figs. 8 and 11 also show some of these parts. On each of the timing shafts 017, 108, 109 and 110 are mounted some collars 123 of larger outside diameter than the shafts themselves, these collars being rigidly connected to their shafts at the positions shown in Fig. 11, and as will be later explained these collars serve as spacing units for other parts to be later described. The timing shafts as illustrated in this paragraph are very simple in construction, and serve nicely as the constantly rotating timing elements called for in this invention, but as previously pointed out, these elements can be built up in many different ways to give the equivalent function.

I will now describe the sets of rotatably mounted timing units, one set for each centrifugal, which are to be in some way actuated by or from the constantly rotating timing members to measure the time cycle for their respective centrifugals.

By referring to Figs. 10 and 11, it will be noticed that faint lines have been drawn through the mechanism to divide same into four approximately equal and uniform zones, designated by the reference letters A', B', C' and D'. It will be seen that each of these zones includes a group or set of mechanism and parts, which is practically identical for each of the zones. That is each part in one zone has practically a corresponding and similar part in each of the other zones. Each such set of parts as embraced within one of the zones, corresponds to one of the four centrifugals shown in Fig. 1. That is, the set of parts in zone A', Fig. 11, is the set of parts that automatically controls centrifugal A, Fig. 1; and likewise the parts in zones or sets B', C' and D', Fig. 11, respectively, are the ones that automatically control centrifugals B, C and D, Fig. 1.

In a general way the description of any one of these sets of parts will serve for all of the sets, because they are substantially alike, and I will now undertake to describe one set. Fig. 9 is a front sectional view presenting one such set quite nicely, and therefore most of the description will relate to this Figure, although Figs. 10 and 11 will also be referred to.

So far as the actual timing is concerned, the most important parts in the set are the rotatably mounted timing units, of which there is one for each controlled operation, and each such unit is adapted to cooperate with, or to be in some way actuated by or from the constantly rotating timing member which corresponds to its controlled operation. These rotatably mounted timing units can vary extensively in their shape and construction, and in the particular manner in which they are actuated from their corresponding constantly rotating timing member, but in the illustrated form of the invention I have elected to show these rotatably mounted timing units in the form of timing discs. Such timing discs, comprising one for each controlled operation of each centrifugal, could easily be mounted concentrically on the above described constantly rotating timing shafts and they could be connected to and actuated thereby in several different ways, but in the particular form of the invention illustrated in the drawings, I have shown these timing discs as mounted below the timing shafts. In Figs. 9 and 11 this set of rotatably mounted timing units comprises the timing discs 124, 125, 126 and 127, these being respectively located immediately below their corresponding timing shafts 107, 108, 109 and 110. In their general aspects these timing discs are all alike, and a top view of same is procured in Fig. 11, and a side view in Fig. 10. The outer periphery or contour 128, of these discs, see Fig. 9, has no gear teeth in the ordinary sense, and is either smooth or slightly roughened as by knurling, such moderate roughness being desirable to give good frictional contact with the constantly rotating timing shafts when the timing discs are forced against them, as will be hereinafter described. In the periphery of each timing disc there is a groove or depression 129 running all across the face of same. Also each disc has a pin 130, projecting sideways therefrom; and it also has a single spoke 131 connecting it with a central hub portion 132, best seen in Figs. 9 and 10, zone A'. This spoke is so arranged with reference to the peripheral rim of the disc that an almost continuous annular opening 133 is formed passing clear through the disc, this opening starting at one side of spoke 131 and continuing all around the disc to the other side of the same spoke 131.

The mode of actuating the rotatably mounted timing units from the constantly rotating timing member, and the intervening mechanism required therefor, of course depends upon the particular form and design of these parts, but one of the advantages of the form and design illustrated in the appended drawings, is the simplicity by which the timing discs 124, 125 etc., can be actuated by their respective timing shafts 107, 108 etc. In fact, it is merely necessary to force these timing discs up against these constantly rotating shafts, and the frictional engagement is sufficient to rotate the discs to measure time. In this way the discs rotate with a uniform constant speed, and the movement is not jerky or intermittent, as would be the case if the discs were in some way actuated through pawl and ratchet, or some other mechanism, intervening between the disc and the constantly rotating timing members. As a matter of fact, the mode of driving these discs frictionally from the constantly rotating timing mechanism has the advantage of simplicity, because there is no intervening mechanism between the disc and the constantly rotating parts. The engagement is direct and immediate, and in addition to the advantage mentioned, certain other advantages are also derived.

If the timing discs were concentrically mounted on the constantly rotating shafts, then the collars 123, which as previously explained, are rigidly connected to the shafts, would be larger than shown, and for the purpose of frictionally engaging and disengaging the discs with the constantly rotating members, some force would be applied lengthwise of the shaft to press the timing discs sideways against these collars 123, which would cause the discs to rotate with the constantly rotating shafts when this force is applied, and would release and leave the discs free when this force is discontinued. But in the arrangement illustrated in the drawings, where these timing discs are located below their respective constantly rotating shafts, a vertical force must be applied to the discs to push them upward so that their circumference makes strong frictional contact with the circumference of their constantly rotating shafts, so that the discs can be rotated thereby. This vertical force is imparted to the discs primarily by the air cylinders 134, which are anchored to the stationary cross-bars 135, running across the cabinet. These cylinders have pistons including cup packers 136, therein, the air force being transmitted in an obvious manner to piston rod 137, which at its upper end is fastened to bracket 138, these various parts being best illustrated in the sectioned cylinder 134, Fig. 9, and in the sectioned parts in zone C' and A', Fig. 10. The bracket 138 has a central vertical post 138$^1$, into which is screwed the bobbin member 139, best shown in zone A', Fig. 10, and this member carries the ball-bearing 140 which fits in the hub 132 of the timing disc and supports the same in an obvious manner. In addition to the central vertical post 138$^1$ already described, the bracket 138 also has an upwardly extending annular part, sweeping around concentric with the annular disc opening 133, this portion of the bracket being indicated between the dotted lines 138$^2$ in these timing discs as shown in Fig. 9; and near the top, this annular bracket portion 138$^2$ rises integrally in the two arms 138$^3$, the latter carying the two sidewardly extending guide portions 138$^4$. It will be noticed that these guide portions slidably embrace the respective timing shafts, and lie between the spacing collars 123, so that by means of these guides, the bracket 138 is held against sidewise movement because of the body of the shaft, and the bracket is held against movement lengthwise of the shaft because of the spacing collars 123 thereon. Therefore considering the cylinder 134 and the bracket 138 as a whole, the former being anchored at its bottom by means of bolt 141 in stationary bar 135, and the latter being guided at its top by means of the guide parts 138$^4$ on the shaft as just indicated, it follows that the two together form a well supported unit which is well adapted to carry the timing disc by means of the bobbin 139, and ball-bearing 140 as already referred to. Each of the timing discs in the cabinet is supported in the manner just described. In addition, and for the purpose of retrieving each timing disc after it has measured its time period, each such disc has a helical retrieving spring 142, one end of which is connected to bobbin 139 in any suitable manner, and the other end of which is connected to pin 143. The bobbin being stationary, that end of the spring which is fastened to it may be said to be anchored at a fixed position, whereas the other end moves with the timing disc and pin 143 therein When the timing disc is released from frictional engagement with its timing shaft, this spring 142 retrieves the disc by rotating it clockwise on its ball-bearing 140, until the advanced face of spoke 131 comes in contact with the adjusting rod 144 corresponding to its disc. As will be noted in Fig. 9 there is one such adjusting rod 144 for each of the four discs shown, (that is, for each of the controlled operations), and this rod 144 lies parallel to the constantly rotating timing shafts 107, 108 etc., and passes all the way across the cabinet, as indicated in Fig. 10 where one of these rods appears. In other words, each rod passes through all of the timing discs that correspond to one of the timed operations for all the centrifugals, this rod passing through the annular opening 133 of each timing disc. Ordinarily, these adjusting rods 144 are locked in a fixed position, but when the time period of the discs which they govern is changed, the position of these rods is changed, but this operation, together with the particular means of supporting these rods 144 will be discussed in detail later.

From the description of the parts thus far given, it will be apparent that the operation of the timing disc is as follows, the disc 126, under timing shaft 109, Fig. 9, being used for this description. In this figure the timing disc is shown pressed against the shaft 109. This condition assumes that compressed air is at this moment in cylinder chamber 145, below the piston cup 136. But in order to start at the beginning, let us suppose that the compressed air is released from this chamber 145, in which case spring 146 in cylinder 134 will pull piston rod 137 downward until clearance at 147 is eliminated, and this downard movement of rod 137 will of course carry with it bracket 138, and the timing disc 126 which is carried by said bracket. This will open up a very small clearance between the periphery 128 of timing disc 126, and the periphery of shaft 109. In other words, the disc is no longer frictionally engaged with shaft 109, and consequently retrieving spring 142 will draw the disc 126 around clockwise until the forward side of spoke 131 comes in contact with the adjusting rod 144 which will arrest the disc in this position. The timing disc will remain indefinitely in this position, so long as no compressed air is supplied into chamber 145, although the timing shaft 109 will continue to rotate constantly while the disc is thus at rest. However, as soon as compressed air is admitted to chamber 145, below the piston cup 136, the piston rod 137, with bracket 138, and timing disc 126, will promptly jump upward until the periphery of the timing disc is in contact with the constantly rotating shaft 109, and since the force of the compressed air upward against piston cup 136 is considerable, the frictional engagement between the timing disc and shaft 109 will also be considerable, and the timing disc 126 will therefore commence to rotate counter-clockwise, the spoke 131 leaving rod 144, and the pin 130 which projects out horizontally from the disc will approach the position 148 where it performs the function that is required at the end of the time period measured by this disc. The length of time that the disc has measured will of course correspond with the arc that the disc has moved through from the point where spoke 131 rested against bar 144, to the point where the disc pin 130 reaches its actuating position 148. If the length of this arc is increased by shifting the position of adjusting rod 144 clockwise in the disc opening 133 (by mechanism to be hereinafter described), the length of the measured time period will of course be proportionately increased; and conversely, if the position of adjusting rod 144 is shifted counter-clockwise, the length of the measured time period will be proportionately decreased. The length of the time period therefore depends on the position of adjusting rod 144, and this can be changed in a manner that will be hereinafter described. After the disc pin 130 has reached its actuating position 148, and has performed its duties there, the compressed air can be released from cylinder chamber 145, and the timing disc will be thereby cleared and disconnected from the constantly rotating timing shaft 109, this clearing action being hastened by the force of spring 146 in cylinder 134, and with the disc thus disengaged from the shaft, the retrieving spring 142 will retrieve the timing disc till its spoke 131 again collides with and rests upon the adjusting rod 144 in whatever position the latter is locked. This is the same position of the disc 126, at which the foregoing description of its operation commenced, and the description of this much of the disc action is therefore completed. The mode by which compressed air is admitted to, and released from, the cylinder chamber 145, and the connections by which this is effected will be subsequently described.

I now wish to describe what happens when the disc pin 130 reaches its actuating position 148 to perform its duty there. The eventual duty is of course to cause the happening at its centrifugal, of the event to which the particular timing disc relates. Since, as previously described, the constantly rotating timing shaft 109, being the third from the left in the series of such shafts, relates to the function of automatically shifting the syrup gutters 33 at the centrifugals, it follows that when pin 30 in the timing disc 126, reaches its actuating position 148, the event that will happen, will be the automatic shifting of the syrup gutter 33, at the particular centrifugal corresponding to this particular disc 126. What actually happens when pin 130 reaches position 148, is that this pin at this position actuates some energy releasing arrangement, such as a switch of some sort if the operation is electrical, or a valve of some sort if the operation is hydraulic or pneumatic. The actuation of such switch or valve, when the pin reaches this position 148, can of course be direct, or else through intervening parts, all depending upon the specific arrangement. In the arrangement shown in the drawings, the operation is pneumatic and consequently the pin 130 actuates a valve when it reaches position 148, and this valve releases energy in the form of compressed air through connections that will be described, to actuate the syrup gutter at its centrifugal. In Fig. 9 the particular valve actuated by pin 130 of disc 126, is shown just above this timing disc 126 along the right hand part of same. In order to illustrate this valve more clearly an enlarged view of same is given in Fig. 9ª, to which reference should be made in connection with the following description thereof.

This valve, designated generally by reference numeral 149, consists of a valve body 150 having a screw threaded neck portion 151 at the top, this neck portion passing through a supporting valve platform 152, the latter passing all the way across the cabinet and being attached in any suitable manner to the cabinet walls 120 and 121. It is understood that each valve platform 152 supports the valves corresponding to the particular controlled operation of the battery of parts to which the platform belongs. Each valve is fastened to its platform by a nut 153. In this valve body there is an opening 154 passing entirely through the body lengthwise thereof, and in this opening there is formed an upwardly facing valve seat 155, and a downwardly facing valve seat 156, with a side opening 157 entering the valve body between these seats, and two radial discharge openings 158 entering the body below seat 156, both these openings 157 and 158 being in communication with the lengthwise opening 154. In opening 154 there is located a valve stem comprising an upper part 159 and a lower part 160, these two parts being joined together to move and operate as a single unit, and on this valve stem there is a downwardly pointing valve face 161, adapted to cooperate with valve seat 155, and the stem also has an upwardly pointing valve face 162 adapted to cooperate with valve seat 156. On the bottom of the stem there is a pin 163 at a fixed position on the stem, and also a spring cage 164 the bore of which is slightly larger than stem 160 so the cage can freely slide up and down along the stem 160. This spring cage 164 has two oppositely disposed slots 165 therein, through which pin 163 passes. In the spring cage is located spring 166, which is installed therein under considerable initial compression, the top end of this spring pressing against the bottom of valve stem 160, and the bottom of the spring pressing against the plug 167 which is firmly fastened in the bottom of the tubular spring cage 166. Normally this spring 166 pushes spring cage 164 downward, until the upper end of slots 165 of the cage, come in contact with pin 163 which acts as a stop to prevent the spring from pushing the cage off of valve stem 160. Compressed air is supplied from an air header 168 running across the cabinet above each battery of valves, the air passing from the header through tubular connection 169 into opening 154 in the valve body, the union nut 170 serving to make a good air-tight joint between the top of the valve body and the tubular connection 169. The opening 157 from the side of the valve body is connected by means of copper tubing to the particular cylinder or diaphragm at the particular centrifugal to which the particular valve in question relates. These individual connections of the valves will be more fully discussed later. The operation of a single valve is as follows:

Normally the reaction of the compressed air from the supply header above the valve stem, is downward on the latter, and this reaction together with its own weight, causes the valve stem to drop until valve face 161 of the stem closes upon seat 155 in the valve body, thereby holding the valve closed, and restraining the compressed air from leaving the valve. Since the distance between faces 161 and 162, on the valve stem, is slightly longer than the distance between valve seats 155 and 156, it is apparent that the valve stem is susceptible of a moderate vertical movement in the body. Therefore if the valve stem is now lifted until valve face 162 closes against valve seat 156, it is obvious that this will lift face 161 off of seat 155, thus opening the valve at the latter point, and allowing the compressed air to rush downward from supply header 168 through the valve, past seat 155, and out through side opening 157, to whatever cylinder this valve is connected at the further end of tube 59, Fig. 9ª, it being understood that the air cannot at this time escape past seat 156, because the valve is at this time closed at this place. So long as stem 160 is held upward in this manner, with valve face 162 firmly pressing against seat 156, the compressed air from the supply header will be acting upon the cylinder at the further end of tube 59. However, as soon as valve stem 160 is released, its weight plus the downward reaction of the compressed air thereon, will again cause this stem to drop until its valve face 161 again closes against valve seat 155, thereby closing the valve and cutting off the supply from the header, and simultaneously opening the valve between seat 156 and face 162, which permits the air in the cylinder to rush back through tube 59, down past valve seat 156 now open, and out to the atmosphere through the radial exhaust openings 158. This description clearly illustrates the operation of the valve, and this operation is substantially identical for all the valves shown in the cabinet.

The manner in which the disc pin 130, of the third disc 126, in Fig. 9, actuates this valve when the pin reaches its actuating position 148, will now be apparent, as follows: Just before pin 130 contacts with the bottom pin of the spring cage 164, which is located along line 148, the valve stem will of course be at its lowermost position, with the valve closed and its valve face 161 resting against valve seat 155. At this moment there will be no compressed air in tube 59, or in the syrup gutter cylinder 53 to which this particular valve 149 is connected. As soon as pin 130 in its counter-clockwise rotation contacts with the lower end of spring cage 164, the pin, which continues to rotate, lifts the valve stem 160, thereby opening the valve at seat 155, and closing it at seat 156, as previously described, which allows air to rush from the supply header 168 down and out through the valve, and through tubing connection 59 to the syrup gutter cylinder 53 at the centrifugal, shifting the latter as had been previously described. At approximately the instant when pin 130 lifted the valve stem in this manner, the forward edge of the notch or depression 129 in the periphery of the timing disc 126, passed just under the center of the constantly rotating timing shaft 109, and immediately thereafter this notch 129 commences to ride up with this shaft until the shoulder 172 on piston rod 137 in the air cylinder 134 butts against the bottom of cylinder head 173, which limits the upward movement of the parts as forced up by the compressed air until the notch 129 is entirely up on the shaft, to correspond with the relative position of the first timing disc 124, on its timing shaft 107, as shown in Fig. 9. The timing disc cannot be driven so high into the shaft that the bottom of notch 129 drags on the shaft. The limiting shoulder 172 on the piston rod in cylinder 134 prevents this. The relative position between disc 124 and shaft 107, as shown in Fig. 9, is the highest that any of the timing discs can go to. In this position it is obvious that the shaft cannot turn the disc further in its usual forward counter-clockwise direction, and it is also obvious that the disc cannot be retrieved clockwise so long as the compressed air remains in the cylinder chamber 145, because the shaft prevents this by acting somewhat in the nature of a key with respect to the notch or depression 129. However, as soon as the compressed air is released from cylinder chamber 145, the timing disc 126 will be drawn downward and completely out of engagement from shaft 109 as previously described, and this disc therefore will immediately retrieve against its adjusting rod 144 under action of retrieving spring 142, as previously described. Of course the moment the pin 130 breaks contact with the lower end of spring cage 164, during this retrieving action, the valve stem will drop and close the valve at seat 155, thus cutting off the air supply, and the valve will simultaneously open at seat 156, thereby allowing the compressed air to exhaust from cylinder 33 to the atmosphere by passing backward through tube 59, down past seat 156, and out through the valve exhaust opening 158, as previously described. As soon as this occurs the retrieving spring in cylinder 53 will of course retrieve gutter 33 to its initial position as shown in Fig. 2. The object of spring 166 in spring cage 164, is to permit notch 129 of the timing disc to ride up to its maximum position on the shaft by compressing this spring 166. I might add that this spring is originally put in the cage under a degree of compression that exceeds the downward reaction of the compressed air against the valve stem in the valve body, so that when pin 130 commences to lift the valve cage, this immediately shifts the valve stem to open position as shown in Fig. 9ª, without causing any compression of spring 166 during this shifting of the stem; but as soon as the stem is entirely shifted, then the further compressing of spring 166 commences in order to permit notch 129 to ride up into its final position on shaft 109.

All the valves in the battery corresponding to shaft 109 are for the purpose of shifting the syrup gutters for the various centrifugals as just described; and all the valves in the battery corresponding to shaft 110 are for the purpose of cutting off the power and applying the brake. This is apparent both from Figs. 9 and 11, where the tubes from the former battery of valves are designated by reference numeral 59, which are the tubes shown in Figs. 1 and 2 as connecting with the syrup gutter cylinders 53 for the various centrifugals; and the tubes leading from the latter battery of valves, corresponding to shaft 110, are designated by reference numeral 71, which are the tubes shown in Figs. 1 and 2 as connecting with the power-off cylinders 61, to cut off the power and apply the brake as has been hereinbefore described. These two batteries of valves are constructed exactly alike, and operate exactly alike. The first battery of valves from the left however, designated as 149[1], in Fig. 9, and corresponding to the constantly rotating timing shaft 107, although constructed exactly like those previously described, especially as relates to the valve body and such parts of the stem as are located in the body, are nevertheless actuated in a slightly different manner by the introduction of some links between the disc pin and the valve stem. It will be understood that this first battery of valves 149[1], opposite shaft 107, are the ones that are connected to the respective wash water valves 42, the connection being made through copper tubing 52 shown in Figs. 1, 2, 9 and 11. As will be described in a moment, the timing disc 124, operating under shaft 107 opens the air valve 149[1], which supplies compressed air to open the wash fluid valve 42 as hereinbefore described; and the timing disc 125 acting under shaft 108, serves to close the wash fluid valve 42 by releasing the compressed air therefrom through tube 52, which it does by causing the air valve 149[1] to close after a predetermined period of time. How these parts cooperate to do this will now be described.

It may be said at the outset that timing discs 124 and 125 rotate to measure time under the impulse of their respective shafts 107 and 108, in precisely the same manner as has been hereinbefore described in connection with timing disc 126 and shaft 109. The only difference between discs 124 and 126, is that the pin 130[1] in the former has a flat face at the top, instead of being entirely round like the other pins in the other timing discs. When this pin 130[1], in disc 124 reaches the point where it commences to actuate and open the valve, this pin comes in contact with a plunger 174, an enlarged view of which is shown in Fig. 9b. This plunger is free to move up and down in the barrel 175 of a lever casting 176, shown in Fig. 9, this casting having in addition to barrel 175, a heavy counterweight part 177, also a foot part 178, and two ears 179, the latter being best shown in the top view of this casting as illustrated in Fig. 11, where the valve platform 152 has been broken away in zone C', just above this casting 176, in order to expose the latter to view. Through these ears 179 loosely passes a pivot pin 180, the latter being firmly held in the ears 181 of a hanger casting 182 which is pivotally mounted on the non-rotating shaft 183. As will be noticed in Fig. 9b, the plunger 174 is held from falling out of the casting barrel 175, because of the following arrangement. Plunger 174 has a slot 184 therein, and a short pin 185 is located in this plunger near the top. This pin is of less length than the diameter of barrel 175, in which the plunger rides, and consequently this pin does not interfere with the free up and down movement of the plunger in the barrel. At right angles to this first pin 185, and located through slot 184, is another pin 186, the latter being rigidly carried by and connected to the casting 176, as indicated in Fig. 9. When the compression spring 187, which is located in barrel 175, and which has its lower end resting against the top of plunger 174, and its upper end resting against the pivot pin 180, pushes the plunger downward, the cross-pin 185 in the plunger eventually contacts with the other pin 186 carried by the casting, and the contact of these two pins against each other prevents the plunger from being forced down and out of barrel 175. Spring 187 operates exactly like previously described spring 166 of valve 149.

Before disc pin 130¹ contacts with the bottom of plunger 174, the weight of castings 176 and 182 will cause them to drop until the hanger casting 182 rests on the non-rotating shaft or rod 188, the latter acting as a stop. In this position the small pin 180 will drop entirely away and clear from the lower end of valve stem 160¹ of valve 149¹, and this valve will therefore be closed. It might be added that the construction of this valve 149¹ is exactly like that shown in Fig. 9ª, assuming however, that the valve stem of latter has been cut short at the dotted line 160² as shown in this figure. With this in mind it will be understood that when the small pin 180, shown in Fig. 9, drops entirely out of engagement from the bottom of the valve stem 160¹, so that clearance exists between these parts, then this valve 149¹ will close, in exactly the same way that valve 149 closed when the disc pin 130 broke contact with it, as was previously described in detail. Since casting 176 is pivotally connected to the hanger casting 182 by means of pin 180, it follows that the counterweight portion 177 will cause this casting to swing around counter-clockwise on pin 180 until the plunger 174 reaches the stop rod 189, where the casting and plunger 174 will be held in proper alignment for contact with disc pin 130¹ when latter reaches it. When the timing disc 124 then carries this disc pin 130¹ to the place where latter contacts with the bottom of plunger 174, the continued rotation of this disc and pin will of course lift casting 176, and consequently pin 179 carried in the top of this casting and properly guided by hanger 182 on rod 183, will contact with the bottom of valve stem 160¹ of valve 149¹, and will lift this stem to open this valve in exactly the same manner as has been previously described in connection with valve 149 opposite the constantly rotating shaft 109, Fig. 9. The valve 149¹ being thus opened, compressed air supplied from its header 168 will pass down through this valve, out through tube 52 to wash water valve 42 at the particular centrifugal to which the particular air valve 149¹ is connected, and this wash water valve 42 will thereupon open to allow the wash liquor to flow in accordance with detailed description previously given. This wash liquor will of course continue to flow at the centrifugal so long as air valve 149¹ is held open, and since the disc 124 will hold this valve open because its depression 129 in its periphery engages shaft 107 as shown in Fig. 9, the automatic turning off of the wash water will depend upon the timed operation of the second timing disc 125, which at the end of its time measurement will cut off the wash liquor by closing wash fluid valve 42 in the following manner. In the course of the counter-clockwise rotation of timing disc 125, its disc pin 130 will presently engage the outer face 190 of the foot portion 178 of casting 176, and then the further forward movement of this pin 130, in a counter-clockwise direction, will of course exert a force on casting 176 tending to rotate it in a clockwise rotation around its supporting pin 180, and there being no adequate resistance to this force, the casting 176 will rotate around pin 180 in this manner, and the plunger 174 will naturally slide off the flat upper face of pin 130¹, of disc 124, where it had been previously resting to hold valve 149¹ open. As soon as plunger 174 slips off pin 130¹, and loses its support in this manner, the weight of castings 176 and 182, of course causes these members to drop until hanger casting 182 again rests on stop rod 188, at which time the valve 149¹ will be closed because pin 180 completely broke contact with and cleared away from the bottom of valve stem 160¹, all of which has been previously described in detail. The air valve 149¹ being now closed, the compressed air in the cylinder 41 of the wash fluid valve 42, will exhaust by blowing backward through tube 52 and out to the atmosphere through valve 149¹ exactly as has been previously described in connection with valve 149, and this action will of course instantly close the wash fluid valve at the centrifugal and stop the application of the spray to the revolving sugar. In this manner we have an illustration of how one of the timing units 125 automatically causes the termination, after a definite time interval, of an operation or effect which had been previously automatically established by one of the other timing units.

Except for some air connections, I have now fully described the operation of one set of cabinet parts corresponding to one of the centrifugals, such set of parts for one centrifugal being illustrated in Fig. 9. As has been previously indicated, and as can be readily understood from Figs. 10 and 11, such set of parts illustrated in Fig. 9, is repeated, one set behind the other, across the depth of the cabinet, these respective sets having been marked off in the previously described zones A', B', C' and D' in said Figs. 10 and 11, each zone corresponding to one of the four centrifugals in the group controlled by this cabinet. By inspection of the parts as illustrated in Figs. 10 and 11, especially Fig. 10, it will be noted that the engagement of the timing discs in one zone or set is entirely independent of the engagement, or disengagement, of the timing discs of any other set. That is the timing disc 127, in zone A', Fig. 10, can be forced upward into engagement with its timing shaft 110, without in any way affecting the corresponding timing discs in zones or sets B', C' and D', which correspond to other centrifugals. That is, there is no mechanical connection of any sort between disc 127 in zone A', Fig. 10, and any of the other timing discs in the same battery as shown in Fig. 10, and therefore each of them can be independently engaged with, and disconnected from the constantly rotating shaft 110, without regard to the others. This independence of the discs in one battery crosswise of the cabinet, not only applies to the one battery of discs 127 illustrated in Fig. 10, but also applies to the other batteries of discs 126, 125 and 124 illustrated in Figs. 9 and 11. This independence of the timers in the different sets or zones A', B', C' and D', is pointed out, because it is upon this feature that the independent operation of the various centrifugals, or other "primary mechanisms", in the controlled group, is based, this being an operating requirement that has been previously discussed in considerable detail. However, although the timers in the different sets or zones are thus independent of each other, those in a particular set are naturally interconnected so as to give whatever timed sequence is desired as between the various operations that constitute the timed cycle of that set and its connected "primary mechanism." Such interconnections between the different timers in one set, corresponding to one centrifugal, or other controlled "primary mechanism", can be made in various ways, all depending upon the nature of the cycle to be produced. The interconnection of these timers are shown in Fig. 9 gives a good arrangement for the cycle in sugar centrifugals, and these connections will now be described, although it will be understood that the same may be extensively varied to suit other types of cycles, with other kinds of operations, and other desired relations between the operations.

As has been previously described in connection with Figs. 1 and 2, when it is desired to place any particular centrifugal in the group under the influence of its timers in the cabinet, this is done by shifting the valve handle 103 into its position shown in Fig. 3, and in this position compressed air will be transmitted from header 104, through the valve 97 and that centrifugal, and through the tube 105, into the particular set of parts in the cabinet that correspond to that centrifugal. Fig. 9 shows this tube 105 entering the cabinet near the lower left hand corner, and connecting into the lower portion of air cylinder 134 under the first timing disc 124; and from the other side of this first cylinder 134 the tube 105¹ connects in obvious manner into the third cylinder 134 under timing disc 126; and from the other side of this cylinder the tube 105² communicates in obvious manner with the fourth cylinder 134 which is under and co-operates with timing disc 127 as previously described. The second cylinder 134 which cooperates with its timing disc 125, is in this arrangement not connected in series with the other three cylinders, but instead is connected by tube 191 through a T fitting 192, near its upper end, to the previously described tube 52 which leads from air valve 149¹ to the cylinder on the wash fluid valve 42, at the centrifugal. These latter connections are best shown and indicated in Figs. 9 and 11, especially the former.

These connections being established, a complete cycle of operations can now be accurately described.

We will assume that one of the centrifugals has just been charged with fillmasse, and the power turned on at hand-wheel 15, to bring the centrifugal to speed, all as previously described. The so-called spinning cycle for that centrifugal, has now commenced, and the lever of hand valve 97 of that centrifugal is shifted to its full line position 103 shown in Fig. 3, which puts the centrifugal under the influence of the timing apparatus in control cabinet 40, and causes the elements therein to commence the timing of the various controlled cycle steps. Valve lever 103 being in this position, compressed air is admitted therethrough into the first, third and fourth cylinders 134, in the cabinet set corresponding to that centrifugal, and the timing discs 124, 126 and 127 corresponding to these cylinders, are instantly lifted into engagement with their respective constantly rotating timing shafts 107, 109 and 110. Thereupon these three timing discs instantly commence to rotate counter-clockwise, as viewed in Fig. 9, the frictional engagement with their timing shafts inducing this rotation as previously described. Each of these timing discs started to rotate from their normal "at rest" positions where the rear edge of their spokes 131 was in contact with their respective adjusting rods 144. From such position these discs move forward with counter-clockwise rotation, and their respective disc pins successively approach their respective positions where they will cause the occurrence of their respective operations or functions. The time that will elapse before each disc pin reaches its final actuating position, will of course be measured by the rotation of the various timing discs, and the length of such time period will depend on the initial position of the stop rods 144 for the respective discs, as has been previously described in detail. With the positions of these various stop rods 144, as indicated in Fig. 9, the pin 130¹, of the first timing disc 124, will be the first to reach its actuating position, and will there lift plunger 174, and through spring 187 will cause pin 180 to lift valve stem 160¹, thereby opening the air valve 149¹, and permit compressed air to pass through tube 52 to open the wash water valve 42 and commence the spraying of the revolving sugar at the proper moment, all as previously described. Simultaneously with the opening of the wash fluid valve, compressed air will be by-passed from tube 52 through tube 191, into the second cylinder 134 which will cause its timing disc 125 to instantly engage its cooperating timing shaft 108, and this second disc 125 will therefore commence to rotate counter-clockwise and to measure its cycle period, from the moment when the wash water commenced to flow. Pin 130 of timing disc 125 will gradually approach face 190, on foot 178, of casting 176, and when this pin 130 makes its contact with face 190, the casting 176 will promptly be rotated clockwise to close the air valve 149¹, which will thereby immediately close the wash fluid valve 42 at the centrifugal, and thereby cut off the spray at the proper time, all as previously described.

The pin 130 of the third disc 126 has been constantly moving forward, and with the setting shown, will in fact reach its actuating position 148, before the wash fluid valve 42 closes, but not withstanding this detail, when this pin on the third disc reaches its destination and actuates its valve 149, the compressed air will be transmitted therethrough, and through its communicating tube 59, to the syrup gutter cylinder 53 at its centrifugal, whereby the syrup gutter 33 of that centrifugal will at the proper instant, be shifted so that the liquor from curb 5 will thereafter drain into trough 32, instead of trough 31 as it had been doing up to that moment. Since the notch 129 in the periphery of this timing disc 126, will thereupon ride up into its shaft 109, and will be held there as previously described, it follows that its air valve 149 will be constantly held open and the air pressure will therefore remain applied to cylinder 53 to hold the syrup gutter in its last named position in spite of the reaction of the retrieving spring in this cylinder. Of course the fourth disc 127 has also been progressing in the measurement of its time period, and when its disc pin 130 will finally come into contact with the bottom edge of its spring cage 164, its valve 149 will thereby be opened in the same manner previously described, and compressed air will be transmitted through tube 71 to the power-off and brake cylinders 61 and 62 successively, thereby stopping the centrifugal, by cutting off the power and applying the brake at the proper moment, all as previously described. The notch 129 in the last timing disc 127, will also ride up on its shaft 110 when it reaches that position, and the compressed air will thereby be held on the power-off and brake cylinders 61 and 62, all through the braking period, and in fact thereafter, until the centrifugal is released from the control.

It will be noted from the foregoing description that an exact time cycle has been stepped off for the particular centrifugal for which the hand valve 97 was thrown, as mentioned in the description just given. Each of the steps was accurately timed with relation to the others by virtue of the timing movement of the discs 124, 125, 126 and 127, as previously described. At the end of the cycle the centrifugal is released from the control by shifting lever 103 of the hand valve of that centrifugal, to the dotted line position 106, shown in Fig. 3, which permits the compressed air to be released from the first, third and fourth cylinders 134, this air rushing backward through tubes 105², 105¹, and 105, and being released to the atmosphere through opening 100 of valve 97. When this occurs, the retrieving springs 146 in each of the cylinders 134, pull their respective mechanisms downward and the timing discs 124, 126 and 127 will immediately drop out of engagement with their respective timing shafts, and these discs will retrieve against their respective stop rods 144, where they will remain until the next cycle occurs at which time they will again be brought into engagement with their shafts, to measure their respective cycle periods for the next cycle, all of which will be repeated exactly as above described. The second timing disc 125 was retrieved to its normal zero position immediately after its pin 130 contacted with face 190 to swing casting 176 as hereinbefore described. Such swinging of this casting resulted in closing air valve 149¹, which permitted the compressed air to exhaust backward through tube 52 as was previously described, and as a result of this the compressed air in cylinder 134 exhausted also, which permitted the timing disc 125 to retrieve to its normal zero position at this time, although the other timing discs 124, 126 and 127 remained in contact with their respective timing shafts until the hand valve 97 was shifted to release position as described.

The cycle operation just described related to one centrifugal only, but it is of course understood that the other centrifugals in the group will be stepped through their time cycles in exactly the same manner, and that the set of timers will start for each whenever its particular hand valve 97 at the centrifugal is thrown into engaging position as shown in Fig. 3. That is, each centrifugal operates entirely independently of the others in the group, because the respective sets of parts, A', B', C' and D' in the cabinet, corresponding to centrifugals A, B, C and D, are adapted to operate independently of each other as between the different sets, all of which has previously been described.

In Fig. 9, and also in Fig. 11, only one set of tubing connections 52, 59, 71, 105 and 191, has been shown, although holes in the cabinet wall in the vicinity of the place where these tubes respectively pass through it, has been indicated in Fig. 9, these holes being respectively indicated by reference numerals 52ª, 59ª, 71ª, 105ª and 191ª, and it will of course be understood that the other tubes corresponding to the other three zone sets A', B', C' and D' will pass out from the cabinet through their proper holes just indicated, so that the tubes corresponding to a given operation will come out of the cabinet more or less as a group, and will distribute to their various centrifugals, as is quite clearly indicated in Fig. 1. In Figs. 9 and 11 however, the tubes for only one set of parts have been shown, those for the other sets having been omitted in order to keep the drawings as simple as possible. It is understood however, that the tubes for the other sets are substantially like those shown in Figs. 9 and 11. While discussing this subject of tubing, it would be well to mention that the compressed air is supplied to the three headers 168, running crosswise of the cabinet as indicated in Figs. 9 and 11, through a nipple 193 entering the cabinet through the rear wall 121 thereof, as indicated in Fig. 11, and inside the cabinet, through a series of T's and other fittings, and also through pipes 194 the compressed air is supplied to all three headers 168 as is best illustrated in Figs. 9 and 11, especially the former. The nipple 193 is of course connected to any suitable source for supplying compressed air.

As regards the interconnections between the four cylinders 134 of any given zone set, as illustrated in Fig. 9, it is of course understood that the second cylinder 134, under timing disc 125, could just as readily have been connected in the same series as the other three cylinders, such an entire series connection between the four cylinders being procured if we assume that the first cylinder under disc 124 is connected to the second one through a tubing connection indicated by dotted line 105³, and that the second cylinder is connected to the third one by a tubing connection indicated by dotted line 105⁴, these tubes being fully substituted for tubes 105¹ and 191. When so connected, all four timing discs will simultaneously engage their respective timing shafts 107, 108, 109 and 110, instead of only three of them doing so and the other one coming into engagement subsequently when another of the discs completed its operation as heretofore described. This "entire series operation," with all four cylinders 134 connected in series to start and stop at once, is the simplest and the most natural, but some advantages can be procured by other kinds of interconnections, as for instance, the connections first described in which the second cylinder 134 was separately energized through tube 191 at a time subsequent to the other three, which latter were in direct series with each other. As an illustration of such advantage I cite the following situation in regard to sugar centrifugal operation. Of the various time periods controlled from the cabinet, the second one, namely the period during which the wash water is applied to the sugar must be most accurately determined, because a slight variation would be considerably more detrimental than a variation of similar amount in the other time periods,—although the latter should naturally be quite accurate also. The second time period however, should be the most accurate of all, and it is such increased accuracy for this period that is procured by the special interconnections whereby the second cylinder 134 is energized through tube 191 at the precise moment when the wash water itself is cut on by the first disc 124. I must explain in this connection that although the rate of rotation of shafts 107, 108, 109 and 110 is a constant rate for each shaft, nevertheless it is not necessary for the speed of these shafts to be alike. If desired some of these shafts can travel at a greater or lesser speed than the others, all according to particular requirements, these relative speeds being determined by the relative proportions of gears 111, 112, 113 and 114, and also the intermediate gears between them, which comprise the gear train for driving the constantly rotating timing members 107, 108, 109 and 110. This is the gear train located just behind the rear cabinet wall 121, as illustrated in Fig. 11, the same having been previously described. In the particular arrangement illustrated in the attached drawings, gears 111, 113 and 114 are of equal size, whereas gear 112 is much smaller, and this causes shafts 107, 109 and 110 to rotate at an equal speed, whereas shaft 108 revolves at a different and faster speed than the others, although it is understood that the rate of speed of each shaft is a constant. With this in mind, it will be understood that when the second timing disc 125 engages its shaft 108, it will sweep through its arc at a considerably higher rate of speed than the rate at which the other three timing discs turn. In other words, a given period of time, say 10 seconds, will correspond to a much larger arc of rotation for the second disc 125, than for any of the other three discs which rotate more slowly. Consequently, if any of the parts in the cabinet should gradually wear, or become slightly loose or disarranged after long periods of use, as is the fashion more or less for all machinery, the discrepancies in the measurement of the various time periods as might result therefrom, would be much smaller for the second time period measured by the rapidly traveling disc 125, than for the other periods which are measured by the more slowly revolving discs. In other words, discrepancies between the different parts, would much less affect the accuracy of the second time period, than of the others, the difference being in exact proportion as the second timing disc 125, and its shaft 108, rotate faster than the other discs 124, 126 and 127, and their corresponding shafts. In this way the time period that measures the application of the wash fluid to the sugar in the centrifugals is insured a higher degree of accuracy than the other controlled periods, which is a special requirement in the sugar centrifuging cycle, as previously indicated. For time cycles required for other kinds of products, or for other kinds of "primary mechanisms", other sorts of advantages and benefits can be procured by other changes in the interconnections of the parts, the foregoing being illustrated merely as an example.

There remains to be described how the measured time period of any and each of the controlled operations can be simultaneously adjusted for all the centrifugals in the group, or for all the other primary machines in the group, if different from centrifugals. This can be arranged in many different ways according to the specific arrangement of the constantly rotating timing members, and of the set of rotatably mounted timing units, each unit cooperating with the constantly rotating timing member that corresponds to its controlled operation. In the particular arrangement of parts which I have illustrated in the attached drawings, this simultaneous or collective adjustment of any time period, for all the "primary mechanisms" controlled, is procured by shifting the location of the various stop rods 144, of which there is one for each battery of timing discs, i. e., for each controlled operation. The mode of supporting and adjusting the position of these stop rods is identical for all of them, and I will therefore describe the arrangement in connection with the fourth such rod, and the fourth battery of parts, as shown at the extreme right of Fig. 9, with the understanding that this description also applies to the other three rods 144, and their respective batteries of parts. This fourth rod 144 and its means of support is clearly indicated in Fig. 10, although Figs. 9 and 11 should also be referred to in the following description.

As is apparent, this stop rod passes through the annular opening 133 of all the timing discs 127 in the fourth battery of parts; and just inside the front and rear cabinet walls 120 and 121, the ends of this rod 144 are carried in gears 200 and 201 respectively, as is clearly indicated in Fig. 10. Each of these gears is rigidly fastened to a short shaft 202 which passes through and is rotatably mounted in the adjacent walls 120 and 121 of the cabinet. On the outer ends of these two shafts is rigidly mounted a collar 203 which holds the shaft and gear in position with respect to the cabinet walls. In mesh with these gears 200 and 201, are two pinions 204 and 205 respectively, same being rigidly carried on a pinion shaft 206, which also passes through and is rotatably carried by the front and rear cabinet walls 120 and 121. To the rear end of this pinion shaft is rigidly fastened a cap 207, and the front end of this pinion shaft is threaded and carries the correspondingly threaded wing nut 208 and the cap or wheel-handle 209. The latter is free to slide lengthwise on pinion shaft 206, but is rotatably locked thereto by means of the key 210, see Fig. 10. The co-action between this mechanism is as follows. Let us assume that for some reason it is desired to change the cycle period which is controlled by the battery of timing discs in question. This is done by loosening wing nut 208, and manually rotating the wheel-cap 209 one way or the other according as the time period is to be increased or decreased. Since this wheel-cap is rotatably locked to pinion shaft 206, the latter will turn with it, and the pinions 204 and 205 will cause gears 200 and 201 to rotate, and this in an obvious manner will carry the stop rod 144 around to a new position in the annular opening 133, shown in Fig. 9. It will be understood that the centers of gears 200 and 201 are in line with each other, and are also approximately in line with the centers of the battery of timing discs 127, so that this circular movement of the adjustable stop rod 144 will carry it around concentric with said opening 133 in the timing discs. When the rod 144 has in this way been carried to its new position, to either increase or decrease the cycle period as desired, the rod 144 is locked in this new position by fastening wing nut 208, which causes the rear cap 207 and the front wheel-cap 209 to draw and bind tightly against the cabinet walls 120 and 121, and the frictional grip of these caps locks the position of stop rod 144, in an obvious manner. The construction and arrangement just described is duplicated for each of the other rods 144 acting in the batteries of parts corresponding respectively to timing discs 124, 125 and 126. Each of the four rods 144 determines the period of its particular battery of timing discs, and in the centrifugal cycle previously described, the first such rod governs the time at which the wash water is turned on, the second one governs the time when the wash water is cut off, the third one governs the time when the syrup gutter is shifted, and the fourth one governs the time when the power is cut off and the brake applied. Each of these rods can be manually adjusted in position by turning their corresponding wheel caps 209, of which there are four, to correspond with the four adjustable stop rods 144, as indicated in Figs. 8 and 11. These wheel-caps 209 are mounted on the front face of the cabinet, where they are readily accessible. One obvious advantage in carrying these adjustable stop rods in front and rear gears 200 and 201, and then rotating the latter by pinions 204 and 205, is that these pinions and gears can be nicely timed with each other, and can be permanently so retained, so that the rods 144 will always ride true and parallel across the cabinet without one end of the rod occasionally getting ahead or behind the other, which would slant the rod and cause it to affect the various discs in its battery differently. The arrangement shown holds these rods 144 absolutely true across the cabinet, so that all the timing discs in the battery are equally treated and affected by it, so that the timing period as measured by these timing discs is uniform as to all of them in the same battery. Also any change in the adjustment is obviously uniform and simultaneous for all the timing discs or units in the battery which controls the adjusted period. From a structural standpoint I find it convenient for the stop rod 144 to pass through the annular opening 133 in the timing discs, but this is not absolutely essential, as the stop rod or member could be arranged in many different ways, and could be made to lie either entirely outside of the periphery of the disc, or else it could be made to pass through the exact center of the timing discs, and in either case various arrangements could be made for determining the normal starting position of the disc, and for adjusting this position. In fact, in these other arrangements the stop could be constructed in a more elaborate manner than the simple rod 144 which I have shown, but I find the latter quite satisfactory, especially in connection with the particular disc and shaft construction which I have illustrated in the attached drawings. If it were desired, the simultaneous adjustment for the time period of each battery could even be arranged so that the rotatably mounted timing units in that battery always retrieve against a fixed permanent stop which is never adjusted, and the collective adjustment of the time period could be procured by shifting the position of the energy releasing mechanisms, such as the valves 149¹ and 149, or their equivalent switch units if the operation were electrical, but the latter arrangement is usually more complicated than the one wherein the energy releasing elements are in fixed position, and the stop location for the rotatable timing units is shifted.

For the purpose of clearly showing the length of each of the timing periods, it is preferable that some sort of an indicator arrangement be provided, and that same be in some manner graduated to show the length of the various time periods (or at least the essential ones), in the cycle of operations controlled. Such indicator arrangement could be designed in many different ways, as for instance, a single central dial, onto which the settings of the various batteries and the time period of each could be brought through gearing, so that a series of pointers acting on the same dial could show the total cycle, each pointer indicating the particular time period of the function or operation to which it relates. But a more useful and convenient arrangement is to have a separate dial and pointer for each of the controlled operations, and the dial can be properly graduated to most conveniently show the time period to which it relates. When the adjustment is changed, the relative position between the pointer or index, and the graduated plate or dial is changed to show the changed setting of that time period. It is immaterial whether the pointer (or index) changes its position, or whether the graduated plate or dial changes its position. This detail can be arranged in whichever manner is deemed most convenient. Fig. 8 shows a good practical arrangement, in which there are four graduated dials 211, 212, 213 and 214, all permanently attached to the front cabinet wall 120, and each such dial corresponding to the particular time period, and the battery of parts relating thereto, as located immediately behind the dial in the cabinet. It is found convenient to graduate these dials in minutes and seconds, as indicated in Fig. 8, but of course any other scheme of graduation that suits conditions can be used. In this arrangement there is a pointer on each of these dials, such pointers being respectively designated by reference numerals 215, 216, 217 and 218 on Figs. 8 and 11. These pointers are carried by the collars 203, which as previously indicated are rigidly connected with the short shafts 202, the latter in turn being rigidly connected with the gears 200 and 201 which carry the adjustable stop rods 144 inside the cabinet, and in view of this relationship it is evident that the pointers 215, 216, 217 and 218 will accurately indicate on the dials the positions of their respective stop rods, and that the dials when properly graduated will therefore correctly indicate the time period of each of the controlled operations. When any wheel-cap 209 is rotated, its pointer or index will rotate synchronously therewith, and with the stop rod 144 in the cabinet, so that the index at any moment shows the relative position of the stop rod, and of the corresponding predetermined time period that would be measured by the timing discs for that operation.

From this description it is apparent how the cycle for the centrifugals can be readily changed, by simply rotating the four wheel-caps 209, at any time when the change in fillmasse in tank 1, or any other change in operating conditions, requires adjustment of the cycle. The adjustment of any of the time periods affects all of the centrifugals simultaneously, as previously indicated.

I have previously pointed out how discrepancies either way, in any of the timed steps in the centrifuging cycle for sugar, in one way or another impairs the results, but it is obvious that by means of the quickly adjusted master cycle control hereinbefore described, the cycle can be kept in accurate step with the requirements as they change from time to time. The particular steps mentioned, were of course those for the sugar cycle, and if the mechanism is operating on other products, and on primary machines other than centrifugals, the nature of the cycle steps, and the sequence and coaction between them will of course vary extensively from the specific sugar cycle above described, but all such variations are contemplated within this invention, and the manner of using such master cycle control apparatus on other products than sugar, and in connection with primary mechanisms other than centrifugals, will be quite obvious in view of the preceding explanations given. It is of course understood that if there are more or less than four controlled operations in the cycle, there will correspondingly be more or less batteries of control parts crosswise of the cabinet, to suit the conditions, and also if there are more or less primary mechanisms in the group than the four shown, there will correspondingly be more or less than the four sets or zones of parts, A', B', C' and D' illustrated.

In describing the cabinet parts I have used like reference numerals for like parts in the various sets and batteries of parts. Also, in addition to indicating the sets or zones of parts lengthwise of the cabinet, that correspond to each primary mechanism, and marking same as A', B', C' and D' in the figures, I have also indicated the batteries of parts crosswise of the cabinet, that correspond to each controlled operation, the latter being marked L', M', N' and O' in the figures.

The foregoing concludes the description of this invention, and it is thought that the mode of its operation and construction will be clear from the recitals given. Many changes and modifications of detail can of course be made without departing from the spirit of this invention which is not limited except as specifically stated in the appended claims.

I claim:

1. In combination a plurality of primary mechanisms of the kind that operate on a cycle including a plurality of timed operations, master control apparatus for said primary mechanisms for bringing about certain of said timed operations, said master control apparatus including a plurality of sets of control units each set being operatively connected with one of said primary mechanisms and each set having for each of certain of the timed operations of its primary mechanism a control unit for bringing about the timed operation allotted to that unit, each such control unit including among other parts a rotatably mounted timing member which after turning through a certain arc of rotation cooperates with other parts of its control unit to bring about at its primary mechanism the timed operation allotted to that control unit, said control units being assembled in batteries that are arranged not in the same straight line with each other and each such battery including only such of said control units as bring about the same respective timed operation at the various primary mechanisms, actuating means for each battery of said control units for actuating the said rotatably mounted timing members in the battery to rotate them to measure time, and adjusting means for each battery of said control units for collectively changing for the entire battery the length of arc that each rotatably mounted timing member in the battery rotates through before it brings about the timed operation allotted to its control unit.

2. In combination a plurality of primary mechanisms of the kind that operate on a cycle including a plurality of timed operations, master control apparatus for said primary mechanisms for bringing about certain of said timed operations, said master control apparatus including a plurality of sets of control units each set being operatively connected with one of said primary mechanisms and each set having for each of certain of the timed operations of its primary mechanism a control unit for bringing about the timed operation allotted to that unit, each such control unit including among other parts a rotatably mounted timing member which after turning through a certain arc of rotation cooperates with other parts of its control unit to bring about at its primary mechanism the timed operation allotted to that control unit, said control units being assembled in batteries that are arranged substantially parallel to each other but not in the same straight line with each other, each such battery including all the said control units that bring about the same respective timed operation at the various primary mechanisms, actuating means for each battery of said control units for actuating the said rotatably mounted timing members in the battery to rotate them to measure time, separate independent adjusting means for each battery of said control units for collectively changing for the entire battery the length of arc that each rotatably mounted timing member in the battery rotates through before it brings about the timed operation allotted to its control unit, and a separate graduated indicating dial associated with the said adjusting means of each said battery of control units.

3. In combination a plurality of primary mechanisms of the kind that operate on a cycle including a plurality of timed operations, master control apparatus for said primary mechanisms for bringing about certain of said timed operations, said master control apparatus including a plurality of sets of control units each set being operatively connected with one of said primary mechanisms and each set having for each of certain of the timed operations of its primary mechanism a control unit for bringing about the timed operation allotted to that unit, each such control unit including among other parts a rotatably mounted timing member which after turning through a certain arc of rotation cooperates with other parts of its control unit to bring about at its primary mechanism the timed operation allotted to that control unit, said control units being assembled in batteries that are arranged substantially parallel to each other but not in the same straight line with each other, each such battery including all the said control units that bring about the same respective timed operations at the various primary mechanisms, separate constantly rotating actuating means for each battery of said control units for revolving the said rotatably mounted timing members of its battery to measure time, and adjusting means for each battery of said control units for collectively changing for the entire battery the length of arc that each rotatably mounted timing member in the battery rotates through before it brings about the timed operation allotted to its control unit.

4. In combination a plurality of primary mechanisms of the kind that operate on a cycle including a plurality of timed operations, master control apparatus for said primary mechanisms for bringing about certain of said timed operations, said master control apparatus including a plurality of sets of control units each set being operatively connected with one of said primary mechanisms and each set having for each of certain of the timed operations of its primary mechanism a control unit for bringing about the timed operation allotted to that unit, each such control unit including among other parts a rotatably mounted timing member which after turning through a certain arc of rotation cooperates with other parts of its control unit to bring about at its primary mechanism the timed operation allotted to that control unit, said control units being assembled in batteries that are arranged substantially parallel to each other but not in the same straight line with each other, each such battery including all the said control units that bring about the same respective timed operation at the various primary mechanisms, a separate constantly rotating actuating shaft for each battery of said control units for revolving by means of frictional peripheral engagement the various rotatably mounted timing members of its battery of control units, and adjusting means for each battery of said control units for collectively changing for the entire battery the length of arc that each rotatably mounted timing member in the battery rotates through before it brings about the timed operation allotted to its control unit.

5. In combination a plurality of primary mechanisms of the kind that operate on a cycle including a plurality of timed operations, master control apparatus for said primary mechanisms for bringing about certain of said timed operations, said master control apparatus including a plurality of sets of control units each set being operatively connected with one of said primary mechanisms and each set having for each of certain of the timed operations of its primary mechanism a control unit for bringing about the timed operation allotted to that unit, each such control unit including among other parts a rotatably mounted timing member which at a fixed point in its path of rotation cooperates with other parts of its control unit to bring about at its primary mechanism the timed operation allotted to that unit, said control units being assembled in batteries that are arranged substantially parallel to each other but not in the same straight line with each other, each such battery including all the said control units that bring about the same respective timed operation at the various primary mechanisms, actuating means for rotating said timing members in one direction toward said fixed point in the path of each, retrieving means for rotating said timing members in the opposite direction away from said fixed point in the path of each, an independently adjustable stop mechanism for each battery of said control units for arresting at a certain but adjustable point in their retrieving rotation all the said timing members belonging to the same battery of control units, and a separate graduated indicating dial associated with each such adjustable stop mechanism.

6. In combination a plurality of primary mechanisms of the kind that operate on a cycle including a plurality of timed operations, master control apparatus for said primary mechanisms for bringing about certain of said timed operations, said master control apparatus including a plurality of sets of control units each set being operatively connected with one of said primary mechanisms and each set having for each of certain of the timed operations of its primary mechanism a control unit for bringing about the timed operation allotted to that unit, each such control unit including among other parts a rotatably mounted timing member which at a fixed point in its part of rotation cooperates with other parts of its control unit to bring about at its primary mechanism the timed operation allotted to that unit, said control units being assembled in batteries that are arranged substantially parallel to each other but not in the same straight line with each other, each such battery including all the said control units that bring about the same respective timed operation at the various primary mechanisms, actuating means for rotating said timing members in one direction toward said fixed point in the path of each, retrieving means for rotating said timing members in the opposite direction away from said fixed point in the path of each, a stop bar for each battery of said control units for arresting at a certain but adjustable point in their retrieving rotation all the said timing members belonging to the same battery of control units, each such stop bar being carried by two gears located respectively near the two ends of the battery of control parts that the stop bar serves, and a rotatable pinion shaft with two pinions fast thereon for each battery of said control units, the two said pinions meshing with the two gears of the corresponding battery to rotate the two gears uniformly for thereby adjusting the position of the stop bar uniformly with respect to all the rotatably mounted timing members of the corresponding battery of control parts.

7. In combination a plurality of primary mechanisms of the kind that operate on a cycle including a plurality of timed operations, master control apparatus operatively connected to said primary mechanisms for bringing about at the latter certain of said timed operations, said master control apparatus having timer actuating means, said master control apparatus also having a plurality of sets of control units one such set being allotted for the control of each primary mechanism, and each such set having for each of certain of the timed operations of its primary mechanism a control unit, each such control unit including, first a rotatably mounted timer, second, engaging means for engaging and disengaging said timer actuating means with said timer for actuating the latter to measure time, third a member that coacts with the timer at some point in the path of rotation of the latter to bring about its primary mechanism the timed operation allotted to its control unit; cycle starting means for each primary mechanism and a connection therefrom to the said engaging means of the set of control units that corresponds to that primary mechanism, said control units being assembled in batteries that are arranged substantially parallel to each other, but not in the same straight line with each other, each such battery including all the said control units that bring about the same respective timed operation at the various primary mechanisms, and adjusting means for each battery of said control units for collectively changing for the entire battery the length of arc that each rotatably mounted timer rotates through before it coacts with the other said member to bring about the timed operation allotted to its control unit.

ROBERT ALEXANDER STEPS.